United States Patent [19]

Ebert, Jr.

[11] Patent Number: 4,475,047

[45] Date of Patent: Oct. 2, 1984

[54] UNINTERRUPTIBLE POWER SUPPLIES

[75] Inventor: Harry K. Ebert, Jr., Whippany, N.J.

[73] Assignee: AT&T Bell Laboratories, Murray Hill, N.J.

[21] Appl. No.: 373,136

[22] Filed: Apr. 29, 1982

[51] Int. Cl.³ .............................. H02J 9/06; H02J 7/00
[52] U.S. Cl. ........................................ 307/66; 307/87;
307/129; 364/492; 364/707
[58] Field of Search ....................... 307/46, 48, 64, 66,
307/87, 126, 129; 364/492, 707; 328/155

[56] References Cited

U.S. PATENT DOCUMENTS

| 4,010,381 | 3/1977  | Fickenscher et al. | 307/66   |
| 4,227,154 | 10/1980 | Ebert, Jr.         | 328/141  |
| 4,238,691 | 12/1980 | Ebert, Jr.         | 307/66   |
| 4,241,261 | 12/1980 | Ebert, Jr.         | 307/45   |
| 4,383,184 | 5/1983  | McFarland          | 307/66   |
| 4,384,213 | 5/1983  | Bogel              | 307/64   |
| 4,400,624 | 8/1983  | Ebert, Jr.         | 307/66 X |

Primary Examiner—E. A. Goldberg
Assistant Examiner—Derek Jennings
Attorney, Agent, or Firm—Alfred G. Steinmetz

[57] ABSTRACT

A power train of an uninterruptible power supply selectively transforms its load from a primary source of power to a reserve source of power under control of a stored program control operating in real time. A microprocessor operating in conjunction with a prioritized interrupt controller and a plurality of external counters monitors and responds to signal conditions existing at various points of the power supply. In particular, the amplitude of a primary AC voltage source is sampled at precise angles of the sinusoidal waveform in response to a comb pulse waveform generated to conform to the actual period of the primary AC voltage. The frequencies range is determined by comparing a count interval to the period of the primary AC voltage. Relative power flow from the primary AC voltage source and a reserve AC voltage signal is controlled by relative phasing of the two signals. The reserve AC voltage signal is adjusted in phase during normal operation when all power is supplied by the primary AC voltage source by comparison to an AC output signal of the power supply to either null power dissipation in the generator of the reserve AC voltage signal or to supply charging current to its energizing DC voltage source.

13 Claims, 17 Drawing Figures

FIG. 6 INITIALIZATION ROUTINE

ROUTINE ZERO (CONTINUED)

ROUTINE ONE

ROUTINE FOUR

ROUTINE FOUR (CONTINUED)

ROUTINE FIVE

ROUTINE SIX

UNINTERRUPTIBLE POWER SUPPLIES

TECHNICAL FIELD

This invention is concerned with uninterruptible power supplies having a plurality of input power sources and which are operative to supply a continuous power output irrespective of the condition of individual ones of the input power sources. It is precisely concerned with a stored program control system to monitor the condition of input signals and operate the power supply to maintain a steady output signal. It is also concerned with a control arrangement permitting a reserve input power source to be operated in a continuous readiness state with minimum power dissipation.

BACKGROUND OF THE INVENTION

AC commercial power is often used as a primary power source to power communication and data processing equipment which utilize stored program controls and solid-state integrated circuit technology. These circuits are generally very sensitive to any variations of the input power signal from its desired standard waveform. Commercial AC power waveforms are subject to many variations from the standard waveform due to the demands of other users on the power line and other extraneous factors.

Undesirable power signal variations causing problems include overvoltage and undervoltage conditions, signal outages, and signal transients such as voltage spikes. These power signal variations may alter the stored data or the switching signals and, in extreme cases, may damage the solid-state circuitry. Transient and momentary outages may cause undetected damage in data areas which are not immediately apparent and eventually cause costly shutdowns due to damaged circuitry, disrupted communications, or introduce errors in computations.

To avoid these aforementioned problems, uninterruptible power supplies are utilized to isolate variations in the AC power signal from the equipment being powered and to supply continuous power to an output load regardless of the actual performance of the basic input commercial AC power signal.

One uninterruptible power supply system providing signal variation and signal outage protection to solid-state equipment is disclosed by H. Fickenscher et al in U.S. Pat. No. 4,010,381, issued Mar. 1, 1977, and assigned to the same assignee as the instant application.

This uninterruptible power supply couples two power sources through a single highly reactive transformer structure to supply uninterruptible power to a load to be energized. A primary power source, typically supplied by a commercial utility, customarily continuously supplies power to the output. A secondary or reverse power source is activated to supply power to the load only upon failure or degradation of the primary power source.

Power flow through a highly reactive transformer is a function of the phase angle between an input signal and the output signal. To achieve high efficiency, the reserve power source is continuously operated in an idling condition, that is, the inverter switches are timed to operate so that the output signal of the inverter is substantially in phase with the output signal of the power supply. Hence during idling, no power flows from the reserve source to the output load. Upon failure of the primary source, the reserve power source responds immediately to supply power to the output load.

Since uninterruptible power supplies are frequently used to supply power to data processing type circuits, the reserve power source must act quickly to supply power whenever the primary power source experiences either a permanent or temporary failure in order to maintain the integrity of information in the data processing circuit.

To operate efficiently, the controller for this power supply must accurately monitor and properly measure all input and output signals and respond promptly should an input or output signal become unacceptable.

SUMMARY OF THE INVENTION

Therefore, in an uninterruptible power supply embodying the principles of the invention, a stored program based control system monitors input and output signals and controls a transfer of the load from one power source to another to assure a continuous uninterrupted flow of power to the load.

The uninterruptible power supply includes a ferroresonant regulating transformer with two independent inputs connected in parallel to the magnetic structure and a single output coupled to a load. Commercial AC power is connected to one of the inputs and a battery powered inverter circuit is connected to the second input. Normally when the primary AC signal is acceptable, the inverter circuit is idled through phase control so that it supplies no power to the output. If the primary AC signal is unacceptable, it is disconnected from the regulating transformer and the inverter circuit supplies the output power to the load.

The control system embodied in a microcomputer architecture includes a central processor and associated memory and interfacing circuits. Selected parameters of the input and output signals are monitored through the interface circuits. System control of the power supply is in response to instruction routines stored in the memory which respond to selected parameters detected in the input and output signals. The instruction routines direct the operation of control switches in the power supply which dictate its mode of operation.

In determining the basic mode of operation, that is, whether to energize the load from the primary AC source or the reserve DC source, the stored program control system, through operation of the instruction routines, monitors the AC input power signal for proper frequency and amplitude. When the AC is acceptable, instructions cause the inverter to operate in an idling mode and output power is delivered to the load solely from the input AC signal.

This stored program control system uses a programmable interval timer (PIT) in combination with the instruction routines stored in memory to determine proper frequency, amplitude and phasing of input and output signals and the proper timing of certain sensing and monitoring operations. A first counter included in the PIT is preset for count down interval equivalent to the period of a 58 Hz signal. It is periodically reset in response to the zero crossings of the commercial 60 Hz input signal. As long as the frequency of the commercial primary AC signal input is acceptable, the period of the primary AC signal ends before the stored word therein is completely counted down. Should it be completely counted down before the period ends, the counter is automatically reset with a word for a 60 Hz interval and used to control the frequency of the reserve inverter circuit to supply power to the load.

A second counter in the programmable interval timer (PIT) generates a comb pulse waveform to control the time instants or time slots at which certain sensing operations occur to monitor amplitudes of the primary input AC signal, the output signal and the DC reserve voltage level and in addition at which, certain control operations occur. To generate these time slots, an interval of the first counter is compared with the period of the primary AC signal input and the difference count representing the period-interval difference is utilized by the computer to modulate the individual teeth pulses of the comb pulse waveform of the second PIT counter so that the overall comb waveform width for a fixed number of teeth pulses equals that of the primary input AC signal period. Hence the individual sampling intervals defined relative to the teeth pulses occur at the right instant relative to the actual angle of the sinusoidal AC input signal so that comparison amplitudes stored in memory are accurate for amplitude measuring purposes of the actual AC signal.

A third counter in the PIT is synchronized with the first counter or with a free running internal frequency source and is utilized to provide a number to compute a value controlling the switch driving signals to the inverter.

A fourth PIT type counter is included in the overall architecture and operates in cooperation with the third counter to control the relative phasing of the inverter drive and the phase of the AC input signal.

A reverse DC voltage source is converted to reserve AC, as indicated above, by an inverter circuit. Its switching devices are driven at a controlled phase angle relative to the output AC signal during its idling state so that no power is delivered to the output from the reserve DC voltage source. When the commercial AC is unacceptable, the first counter is allowed to run freely, unsynchronized with the commercial AC, and the inverter circuit runs synchronized to the freely running first counter to supply AC power to the output which is derived from the DC voltage source. The phase ajustment technique used to achieve the idling condition is also used for a further phase adjustment adapted to initiate controlled battery charging from the primary AC voltage source via the inverter circuit's switching devices.

Adjustment of the inverter circuit's phase for both idling and battery charging is determined in response to a zero crossing of the output signal of the power supply. The output signal's zero crossing is utilized to terminate a count down in a preset counter that was initiated by a zero crossing of the primary input AC signal. The remaining count in the third counter at termination is utilized in the computation of a delay word in the fourth counter synchronized with the first counter so that its count down drives the inverter switches with the proper delay to achieve idling of the inverter circuit.

In addition to control of the power train functions of the uninterruptible power supply, the stored program control system includes diagnostic routines which operate, prior to and concurrently with, the power train function control routines. These diagnostic routines check the state of the stored program control itself, and the components of the power supply. The power function control routines allow power processing only as long as all components of the power supply are properly functioning. During actual power processing, the power supply's integrity is continuously monitored.

DETAILED DESCRIPTION

Figure 1:
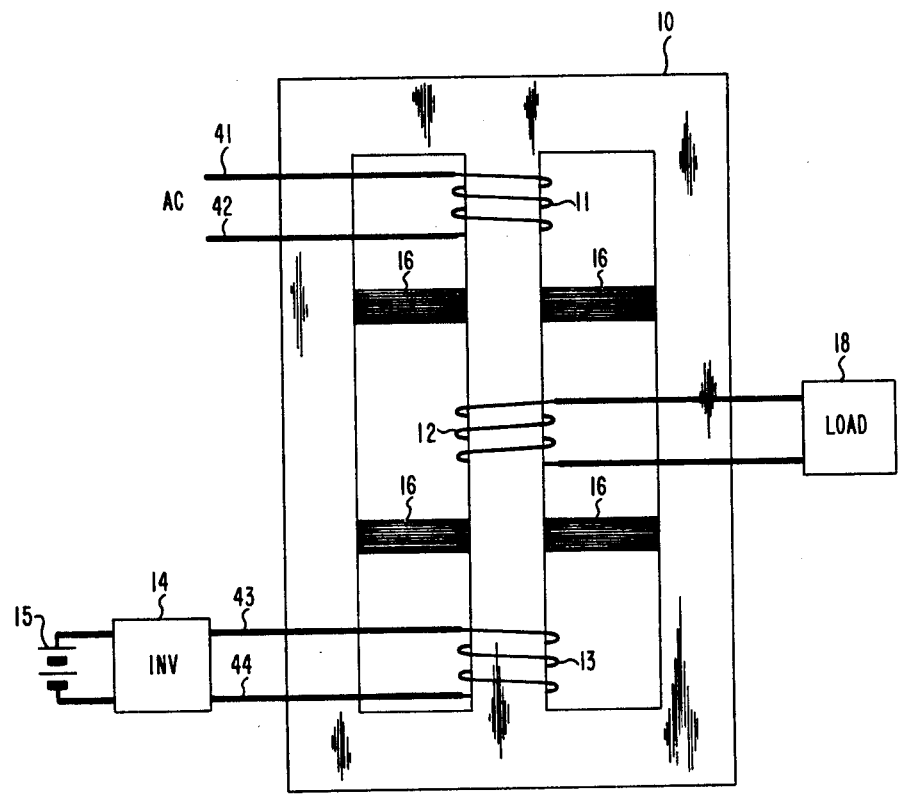
FIG. 1 is a schematic of input and output windings coupled to a highly reactive transformer structure suitable for use as a power coupling medium in the uninterruptible power supply discussed herein.

A transformer structure suitable for use in the uninterruptible power supply disclosed herein is shown in FIG. 1. Transformer structure 10 is shown as having two input windings 11 and 13 and a single output winding 12. The transformer structure is designed so that the input windings 11 and 13 are effectively isolated from each other by magnetic shunts 16 while permitting power to be supplied from input windings 11 and 13 either singly or in combination to the output winding 12. The primary power source, which is normally a power signal supplied by a utility, is coupled to input winding 11 via input leads 41 and 42. The reserve power signal applied to leads 43 and 44 of input winding 13 is an AC signal derived from a DC voltage source 15 which is coupled to an inverter circuit 14. Inverter circuit 14 inverts the DC voltage and applies a periodic reserve power signal to the input winding 13.

Power flow from either input winding 11 or 13 to output winding 12 and to load 18 is controlled by the respective phase angles between the AC signal at that particular input winding 11 or 13 and the AC signal at the output winding 12. For power to flow from an input winding to an output winding, the phase angle at the output winding 12 must lag the phase angle of the signal at either of both of the input windings 11 and 13.

The load 18 coupled to the output winding 12 ideally does not distinguish between which of the two power sources coupled to input windings 11 and 13 is actively supplying power, whether singly or in combination, since the ferroresonant transformer arrangement provides isolation between the power sources and the load.

During normal operation of the power supply, the power signal applied to input winding 11 supplies all the power to the output winding 12 and load 18. Since the reserve power source must supply power quickly upon failure of the primary power source, the inverter 14 is operated in what is known as an idling condition wherein the inverter is running but supplies no power to the output. During idling condition, the inverter switching devices operate so that the signal phase angle of the periodic signal output of the inverter at input winding 13 is controlled to be substantially coincident in phase with the output load signal at the output winding 12.

Figure 2:
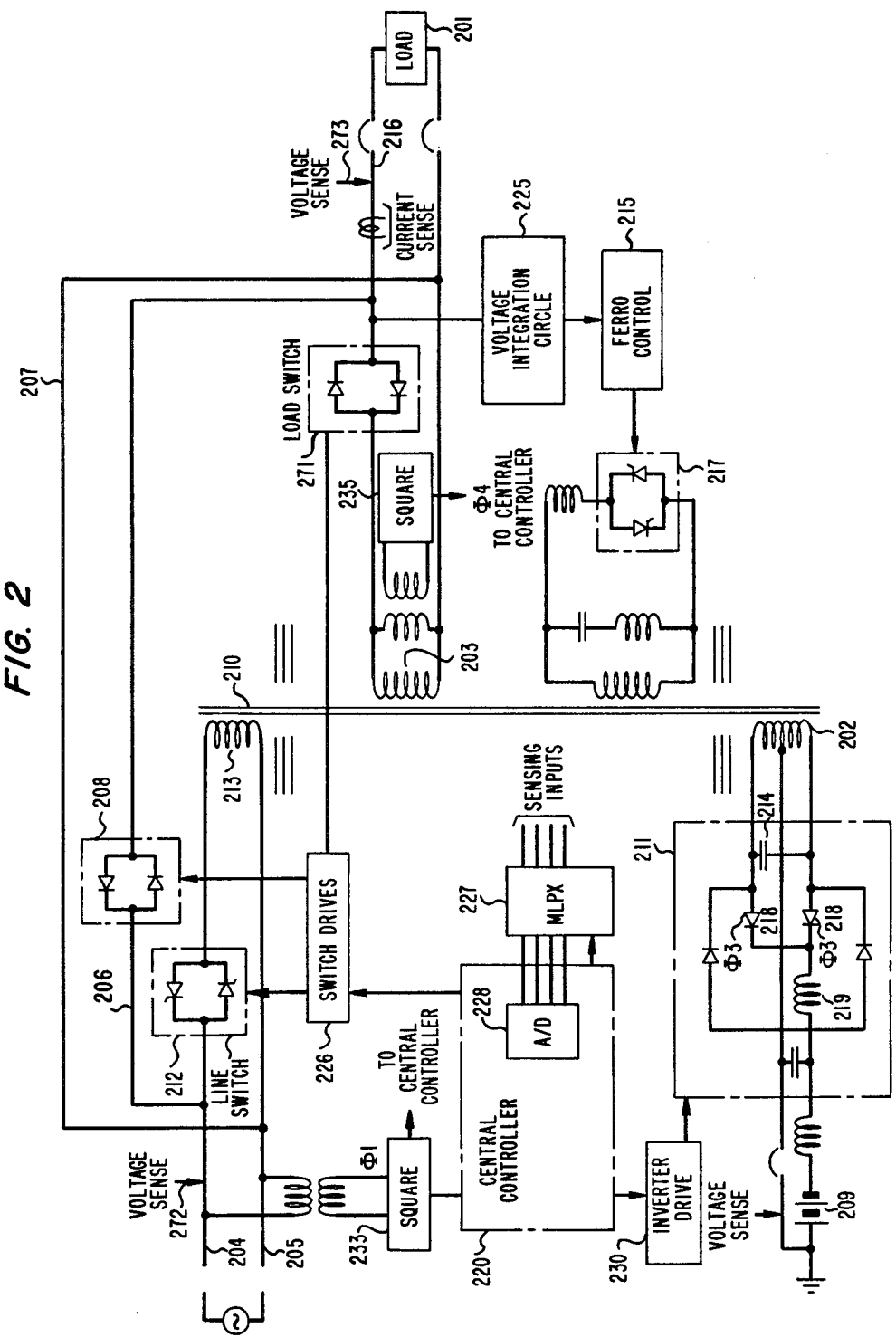
FIG. 2 is a schematic of the power train of an uninterruptible power supply power circuit using the transformer shown in FIG. 1.

How these signal phases are controlled and in response to what control parameters may be ascertained by reference to the schematic of the power train and control circuit of an uninterruptible power supply shown in FIG. 2. This power supply is designed to be operated in three basic modes of operation.

The first mode of operation is a normal mode, in which the commercial AC input signal is the sole source of power supplied to the load 201 through the transformer 210. During this normal mode of operation, the inverter output signal at transformer winding 202 is brought into substantial phase equivalence with the output signal on winding 203 and hence contributes no power to the output. The inverter is said to be running in an idling mode or condition.

The second mode of operation is a bypass mode, in which the commercial AC input signal applied at input leads 204 and 205 is connected directly to the load 201, via leads 206 and 207 and bypass switch 208, bypassing the transformer 210 in situations where the load 201 demands a large current surge such as in starting a motor.

The third and last mode of operation is an internal mode in which the reserve DC voltage source 209 and the inverter 211 energized thereby supplies the output power to load 201 after the primary AC signal has been deemed by the control system as unacceptable and has been disconnected by opening line switch 212.

The uninterruptible power train, as shown in the schematic of FIG. 2, includes a highly reactive transformer 210 such as shown in FIG. 1. The primary AC input signal is applied to the input terminals 204 and 205 and connected through a line switch 212 to a first primary winding 213 of the transformer 210. Transformer 210 is a ferroresonant or highly reactive double-shunt transformer design such as is disclosed in FIG. 1. Its operation and associated control circuitry to form a ferroresonant regulator is well-known in the art and has been described by H. P. Hart and R. J. Kakalec in "The Derivation and Application of Design Equations for Ferroresonant Voltage Regulators and Regulated Rectifiers", IEEE Transactions on Magnetics, Vol. Mag.-7, No. 1, March 1971, pages 205–211.

The regulation circuit controlling voltage regulation in the ferroresonant regulator operates independently of the central controller to be described herein. Regulator or ferro control circuit 215 senses an integrated average output voltage of the AC output terminal 216 supplied by voltage integrator 225 and controls a regulating switch 217 to simulate ferroresonant action and achieve the desired voltage regulation. Voltage integrator 225 integrates the volt seconds output at the output terminal 216 and ferro control circuit 215 responds to the integrated voltage and determines in each cycle of operation when to close the regulating switch 217 thereby introducing extra inductance into the transformer circuit to achieve the ferroresonant regulating action. This is known as closed loop ferroresonant regulation and is described by R. J. Kakalec in "A Feedback Controlled Ferroresonant Voltage Regulator" in the IEEE Transactions on Magnetics, Vol. Mag.-6, No. 1, March 1970, pages 4–8.

The primary winding 213, powered by the primary commercial AC voltage signal, receives its power through a periodically commutated static line switch 212 which comprises oppositely oriented parallel connected SCRs. The line switch 212 is opened each half cycle by a switch drive circuit 226 under control of a central controller 220 which monitors the input AC voltage across lead 204 and 205 with a sense lead 272 and a squaring circuit 233. This voltage value from sense lead 272 is coupled through a multiplexer 227 and an analog-to-digital converter 228 to the central controller 220 which responds thereto in order to cut off the flow of AC power to the transformer winding 213 whenever the primary AC voltage signal is outside predefined acceptable amplitude limits. If the AC input voltage is unacceptable, line switch 212 is opened and left open during the alternate internal mode of operation of the power supply to prevent reverse power flow into the AC line when power is supplied to the transformer by the DC voltage energized inverter circuit 211.

A bypass switch 208 under control of switch drive 226 and central controller 220 is inserted into a bypass line 206 coupling the AC line inputs to the AC output terminal 216. The bypass switch 208 is closed when a high surge current in excess of the capacity of the regulating transformer 210 is called for by a load. It operates in response to detection by the central controller at sense lead 273 of the output voltage dipping below some predetermined limit. As in the case of the line switch 212, the bypass switch 208 consists of inversely parallel-connected naturally commutated SCRs. When the bypass switch 208 is closed, the load switch 271 shown coupling the output winding 203 to the AC output is opened to remove the reactive loading of the transformer 210 from the output circuit presented to the AC line 204,205.

Reserve power during the internal mode of operation is derived from a DC voltage source 209 and is inverted into a periodic AC square wave signal by inverter circuit 211. Inverter circuit 211 is an impulse commutated SCR type inverter circuit of the Bedford McMurray type. Bedford McMurray type inverter circuits are well-known to those skilled in the art and hence it is not described in detail herein. This square wave voltage signal supplies power via winding 202 to the load 201 should the primary AC line voltage signal be found unacceptable. A capacitor 214 and inductor 219 are included in the inverter circuit to insure the turn off of the SCRs in each half cycle.

The central control 220 monitors the various input signals supplied by the commercial AC, by the DC voltage source and the output signals supplied to the load 201. It further operates to control inverter drive 230 which includes an oscillator to supply signals to drive the inverter switching device. Central controller 220 further controls all the line, bypass and load switches (212, 208 and 271, respectively).

When the primary AC input voltage signal is operated and acceptable, the inverter circuit is phased so that the square wave signal the inverter generates at the primary winding 202 is substantially in phase with the AC output voltage signal on winding 203. By proper adjustment of the inverter circuit's signal phase, the inverter circuit does not supply power to the output, and in addition with proper phase adjustment, it operates without any internal power dissipation supplied by DC voltage source 209. If the battery is being charged, charging current is supplied from the AC line (204,205)

through the transformer 210 and in reverse direction through the inverter circuit 211 and is controlled by adjustment of the inverter phase.

As long as the inverter circuit 211's voltage signal is adjusted so that it is substantially in phase with the voltage of the output winding 203 or adjusted to permit battery charging, no power is delivered by the inverter circuit to the load. This permits the inverter circuit 211 to operate continuously with a nondissipative drain on the battery 209. As soon as some irregularity in the AC input voltage signal is detected which renders it unacceptable, line switch 212 is opened to disconnect the line and the central control 220 immediately directs the inverter to operate unsynchronized with the AC input voltage to let it operate to supply power from the battery 209 to the output load 201.

The input primary AC voltage and the output AC voltage are sensed by squaring circuits 233 and 235, respectively, which, in turn, generate two square waves designated $\phi_1$ and $\phi_4$ in phase with these AC signals. The interrelations of the signals are graphically illustrated in FIG. 15, where sinusoidal waveform 1101 is the AC input voltage, sinusoidal waveform 1102 is the AC output voltage and square waves 1103 and 1104 comprise the signals $\phi_1$ and $\phi_4$, respectively. These signals are coupled to the central controller and are utilized thereby by the central controller to identify zero crossings of the primary AC input and AC output voltage signals. These zero crossings are used for control of the inverter circuit signal phase and for measurement of the input and output signals as described hereinbelow.

Figure 3:
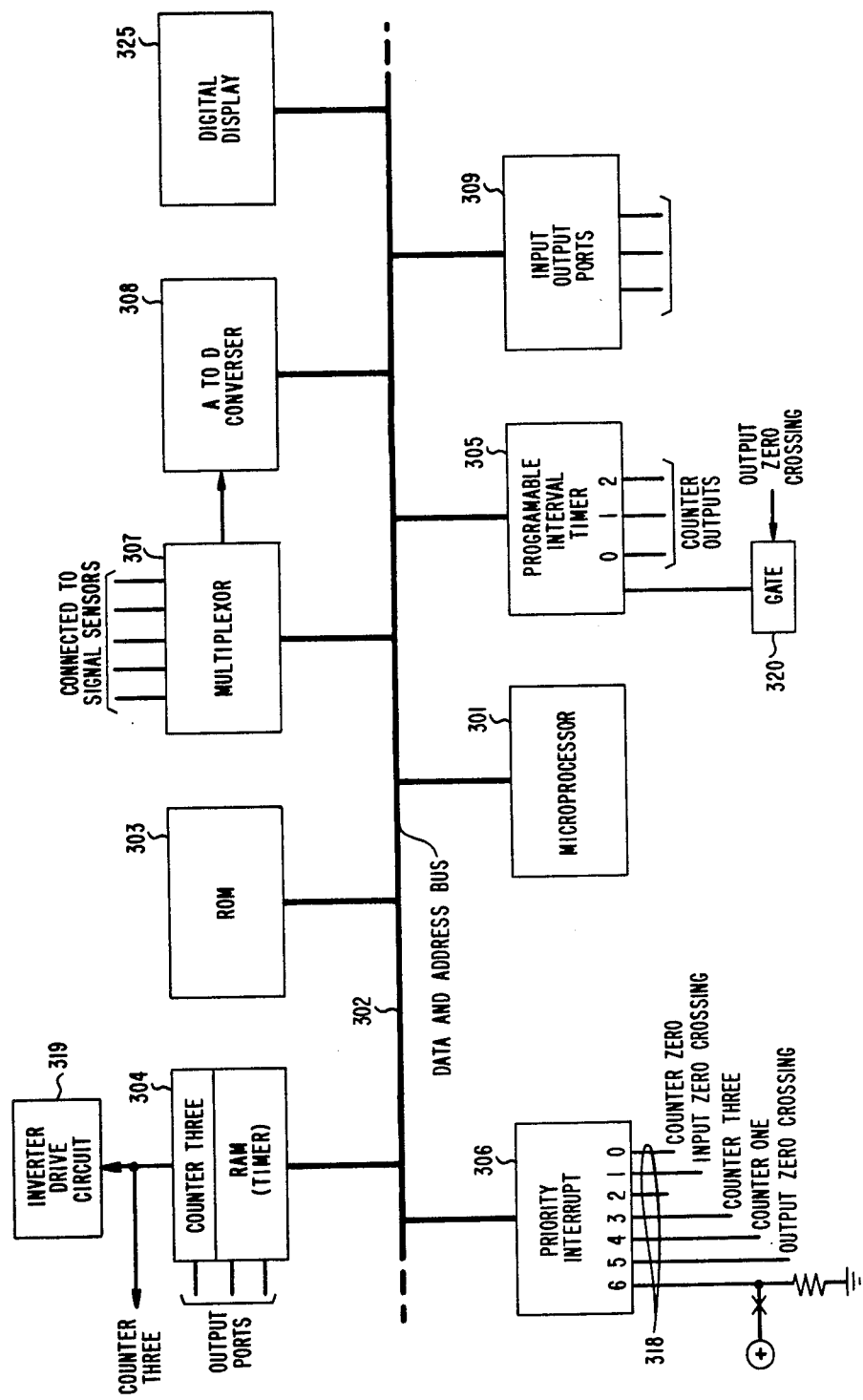
FIG. 3 is a block and schematic of the central processor control circuit which controls the uninterruptible power supply of FIG. 2.

The central controller is shown in block diagram form in FIG. 3 and includes a central processing unit or microprocessor 301 connected to a bus 302 which includes data, address, control and power lines interconnecting the microprocessor to a plurality of peripheral chips, which perform sensory, control and user interaction functions. Normally matching and driver circuits are necessary to interconnect these peripheral chips to a bus. These elements are not shown herein since their use and implementation is obvious to those skilled in the art.

For illustrative purposes, the specific chips in the central controller shown in FIG. 3 are identified herein, but are not intended to limit the practice of the invention to these particular chips. Microprocessor 301 is an INTEL 8085A microprocessor operating at a 6 MH frequency. Memory chips identified as chip 303 are three INTEL 2732 erasable programmable read-only memories into which instruction routines are stored. Random access memory chip 304 which further includes a programmable timer is an INTEL 8155 static RAM. The 8155 chip in addition to the included timer, (the fourth counter designated hereinbelow as counter three), further includes three input/output ports for interfacing with the outside components. Inverter drive circuit 319 is responsive to the output of counter three. The operation of these hardware components is discussed below when describing the inverter SCR drive.

Further timing capability is provided by the programmable interval timer 305, which is the INTEL 8253 multimode programmable interval timer. This particular programmable counter/timer chip 305 contains three independent 16 bit counter circuits whose modes of operation are software controlled. The third counter (designated hereinbelow as counter two) includes an inhibit input controlled by gate 320 which is responsive to a detected zero crossing of the output AC voltage. The use of these four timers or counters in combination with external signals and instruction routines included in memory enables the central controller to operate in real time with respect to the functioning of the power supply which fact will become apparent in the following detailed description.

In accord with the principles of the invention, real time control of the power supply is also achieved by the use of interrupt driven instruction routines which respond to various conditions of the operating power supply. Interrupt priorities are controlled by an interrupt control chip 306 which establishes priorities in accord with the input lead to which an interrupt signal is applied. This priority scheme permits the control of the power supply in real time and assures that the called instruction routines do not interfere with more fundamental routines presently in operation. It also permits an optimal mix of software control and external hardware control of the power supply. Several of its inputs are responsive to the timer outputs of the programmable interval timer chip 305 and others are responsive to particular sensed external occurrences and signals.

The particular interrupt chip used herein is the INTEL 8259A programmable interrupt controller. The interrupt controller is programmed with up to eight addresses of eight instruction routines contained in memory. It also has eight prioritized interrupt input leads 318 (only the six leads in use are shown connected in FIG. 3) corresponding to each stored address and which interconnect to external control signals. An interrupt request at a particular input lead calls the instruction routine at the address corresponding to that input lead and further has priority over an interrupt request at an input lead having lower rating of priority, that is, a higher numerical value and, in turn, will be overridden by an interrupt request at a higher priority rated input lead.

Multiplexer chip 307 is connected to external sensors and is directly coupled, in turn, to an analog-to-digital converter chip 308. This multiplexer chip 307 permits the selective coupling under control of the microprocessor of externally sensed signals to the analog-to-digital converter 308 which, in turn, applies the digital equivalents of these signals thereof to the microcomputer bus 302. Additional chips such as information display chips 325, and input/output chip 309 permit further interfacing with the power supply operating condition switches and operator intervention signals.

The construction of various microprocessor controller architectures using a microprocessor and associated peripheral chips is well-known to those skilled in the art and hence a detailed description thereof is not believed necessary. Specific features and advantages of this control arrangement are discussed hereinbelow.

Figure 4:
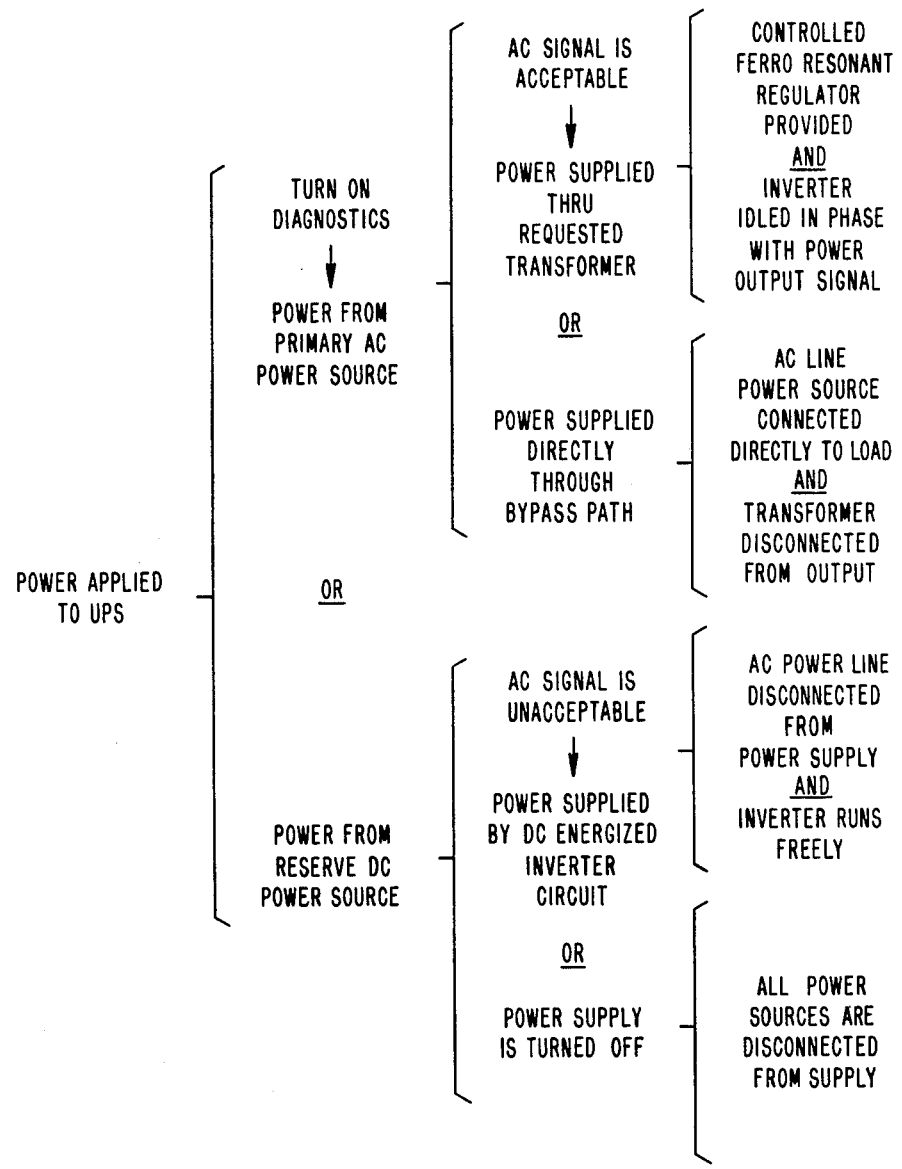
FIG. 4 is a system operation binary tree diagram for illustrating various modes of operation of the uninterruptible power supply.

The main operational features of the uninterruptible power supply may be ascertained by following the system operations binary tree diagram of FIG. 4. When power is connected to the power supply, initial turn-on diagnostics are performed to determine the condition of the central controller itself and the power train. If this diagnostics test is passed, the central controller must choose to either energize the load from the primary AC power source or from the reserve DC power source. If the primary AC is chosen, it may be coupled directly to the load, via the bypass switch, or it may be coupled through the regulating transformer to the load, while the inverter is operated in an idling condition. If the primary AC power signal is unacceptable, power to the load is supplied from the reserve DC power source by allowing the inverter to run freely and disconnecting the primary AC source. If the reserve DC power is unacceptable, the power supply is shut down and disconnected. The manner in which these control features are achieved in real time control is apparent from the following description of the following instructional routines.

Figure 5:
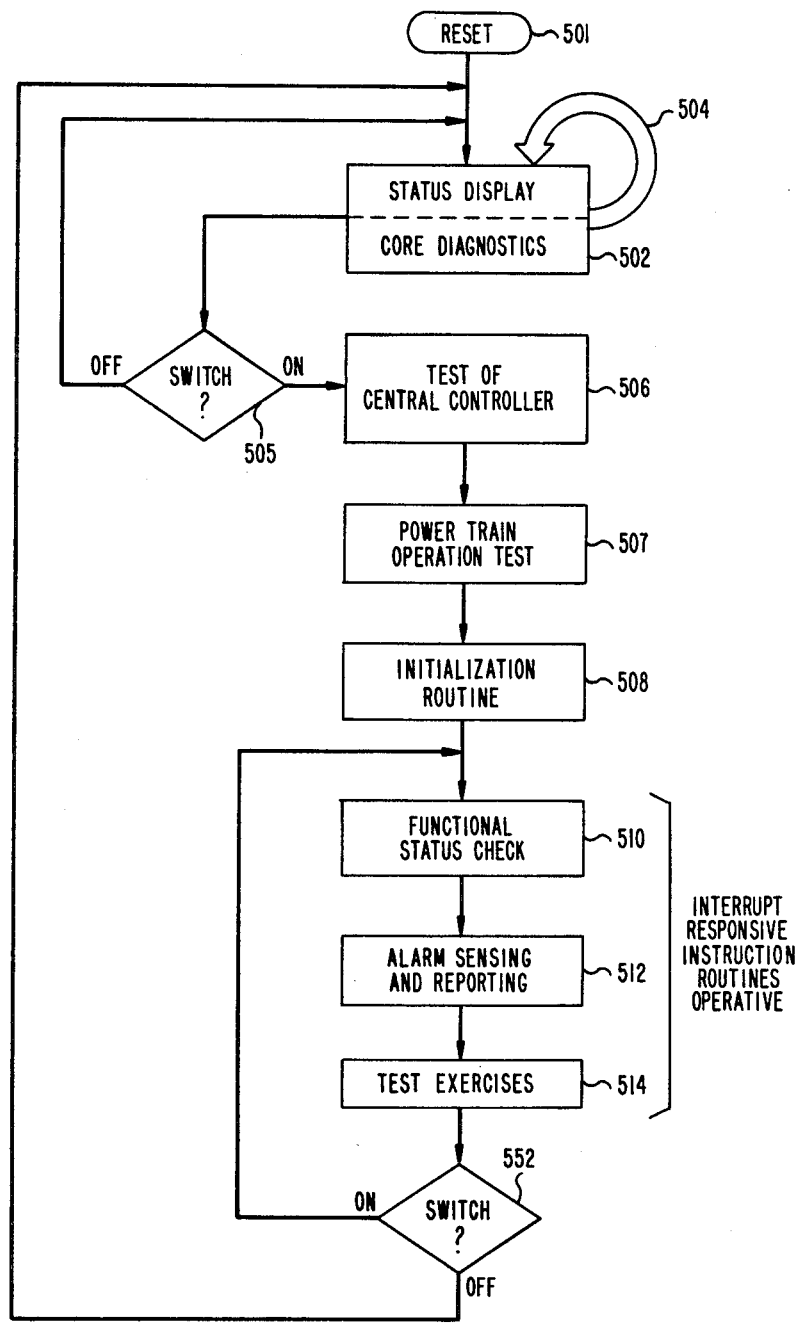
FIG. 5 is a flow chart of the diagnostic instruction routines of the stored program control.

The initial diagnostic routine, disclosed in flow chart form in FIG. 5, investigates the integrity of the power supply and its controls and is initiated when the power supply is initially activated. This diagnostic routine functions both before the power supply processes power and also, during operation of the power processing routines.

The diagnostic routine is of a sequential nature and is divided into two parts: a turn-up diagnostic routine and a running diagnostic routine. Turn-up diagnostic instructions are implemented when the main power switch is turned on and before the power supply, under the direction of the central controller, begins processing power. Running diagnostics are also sequential and are interposed with the interrupt responsive control instruction routines during power processing so that during any absence of a control instruction routine, the running diagnostic routine is being performed. Hence during power processing, the power processing functions are controlled by interrupt driven instruction routines and during the absence of control operations, the system automatically returns to the sequential running diagnostic routine.

As shown by feedback loop 504 in FIG. 5, the central controller is continuously powered and after any reset, the diagnostic routine in process symbol 502 operates a status display to indicate the inactive operative mode that the power train is connected in. It also continuously performs a core diagnostic test which checks the component integrity of the central processing unit to perform valid instruction routines and respond to operating conditions. The core diagnostic test includes such functions as testing of the various memory and interface chips of the central controller. This function in process symbol 502 includes the loop instruction 504 and during functioning of the loop, the off decision of symbol 505 is continuously reevaluated recycling the routine through process symbol 502.

When the on/off switch is turned on to connect power to the power supply, the decision of symbol 505 proceeds to symbol 506 and the turn-up diagnostic routines are implemented. The subsequent turn-up diagnostics of process symbol 506 are concerned again with the operation of the central controller. This diagnostic test again checks the individual components of the central controller. An instruction of subsequent process symbol 507 expands the scope of diagnostic inquiry and checks the operability of the power train and its processing and monitoring components. Should a fault or out-of-limit parameter be detected, an error message is provided to an output information display and power processing is inhibited. With the completion of instructions of process symbol 507 both the central controller and the power train are initialized by instructions of process symbol 508 which represents the initialization routine described below to preset memory words and instructions and allow the beginning of power processing.

After the initialization process in process symbol 508 is complete, the central processor becomes responsive to the interrupt driven instruction routines interspaced with the running diagnostic instruction routines described below. Instructions of process symbol 510 continuously monitor the status of the power supply and provide information at an output display including a history of the status determinations and reasons for any change in status such as a transition in operating mode from a normal mode to an internal mode of operation due to AC signal failure. Instructions of subsequent process symbol 512 sense any alarm conditions from circuit monitors, and instructions in process symbol 514 performs test exercises on power components not in use to confirm their operability. During these serial process functions, the running diagnostic instruction operates through decision symbol 522 to determine if the main power switch is turned on or off whereupon the diagnostic routine is returned to process symbol 510 or process symbol 502 as the decision determination commands.

The power processing control instruction routines are all interrupt driven and are given priority ratings so that the most essential power control functions take precedence over those of lesser importance. These instruction routines are concerned with controlling various connection switches and driving the inverter circuit to achieve either idling operative state, or controlled battery charging through the inverter. By controlling the uninterruptible power supply with interrupt driven instruction routines, the power processing can be controlled in real time with a minimum of hardwired control circuitry. This is critical since the uninterruptible power supply must respond quickly to change in the input signals, output signals and operating conditions to assure a continuous flow of power to the output circuits without disrupting transients occurring. Power processing is controlled by six interrupt driven instruction routines. Prior to implementation of these power processing routines, an initialization routine is called which is identified above as process block 508 of the diagnostic instruction routine flow chart in FIG. 5. This initialization routine primarily presets the counters and places appropriate control words in memory. A first interrupt controlled instruction routine designated herein routine zero is responsive to counter zero in the programmable interval timer as descrited below and is concerned with resetting counters which control timing intervals established to facilitate checking signal frequency acceptability and establishing signal sampling intervals.

A second interrupt controlled instruction routine responsive to a zero crossing of the AC input voltage and lower in priority than the routine zero, determines if the frequency of the input AC signal provided by the primary AC power source is acceptable. The interrupt routines zero and one interact with each other to determine and evaluate the AC signal frequency and see that the inverter drive is properly synchronized to the AC input signal. A third interrupt controlled instruction routine, designated routine three, determines the actual switching times of the inverter circuit's switching devices relative to zero crossings of an output AC signal. A fourth interrupt controlled instruction routine, designated routine four, establishes the amplitude sampling intervals to check power and voltage signals of the power supply and controls timing of the operation of power train switches of the supply so they occur at the proper time relative to the existent power signal. A fifth interrupt driven instruction routine determines the actual phase delay of the inverter signal with respect to the primary AC input signal.

These interrupt driven instruction routines are described herein by utilizing detailed flow charts that indicate the data processing activities of the central control which determines how the uninterruptible power supply is to be controlled. Translation of these flow charts into the appropriate assembly language coding will be readily apparent to those skilled in the art.

Figure 6:
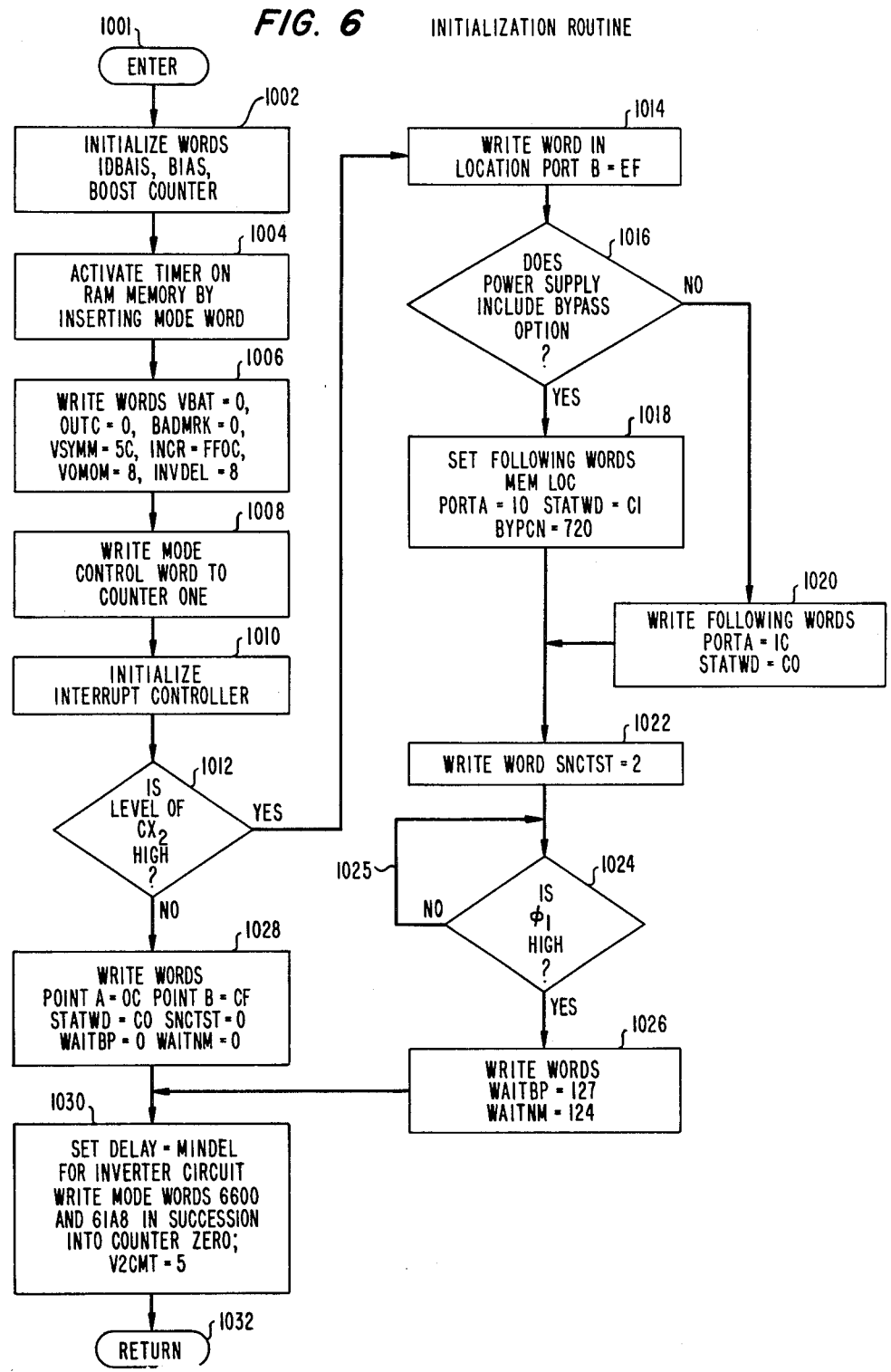
FIGS. 6 through 14 are flow charts of the stored program control instruction routines of the stored program control controlling the processing of power.

The initial power processing routine after the turn-up diagnostics are completed is the initialization routine which is depicted in FIG. 6 in flow chart form. This routine stores the proper timing and status words in active memory and into associated counters. The following word list, which follows below, defines certain timing and status words used in the description of the various instruction routines and in the accompanying flow charts.

STATWD—an output word in memory in which the various bits indicate various conditions of power sources and the power train. The various bit designations are:
  Bit 0—indicates if the power train is in a bypass connection or not. A one represents a bypass connection while a zero represents the connection not in bypass.
  Bit 1—indicates the polarity of the AC output voltage in the most recent past cycle of operation. A one represents a positive polarity and a zero represents a low or negative polarity.
  Bit 2—indicates if the battery is being floated or being boosted represented respectively by a zero or a one.
  Bit 3—indicates the status of an internal square wave generated for the inverter drive. Here a one indicates positive polarity and a zero indicates negative polarity.
  Bit 4—indicates that the inverter circuit is running by being a one; while a zero indicates that the inverter circuit is not running.
  Bit 5—indicates the polarity of the AC input voltage in the most recent half cycle of operation. A one represents a positive polarity.
  Bit 6—indicates if the normal mode is currently operative with a one.
  Bit 7—if a one indicates that the battery may be connected to the inverter circuit.
ACMON—An 8 bit word to indicate which sampling slot established by routine four is currently being executed.
GOODBD—An 8 bit word showing how many times within a half cycle a determination is made that the input AC is acceptable or unacceptable.
DELAYL—least significant part of 16 bit delay number used to control delay of inverter signal phase relative to the AC input signal.
DELAYH—most significant part of 16 bit delay number used to control delay of inverter signal phase relative to the AC input signal.
BYPCNT—a 16 bit bypass count number used to keep track of how long current has dropped below rated value to determine when to come out of bypass.
VOMON—An 8 bit word used to keep track of the output voltage. It controls coupling of A/D converter to sense Vout when the word is less than or equal to zero.
WAITBP—A word set in response to a mode change to inhibit a mode change immediately into bypass.
WAITNM—An 8 bit word set in response to a mode change to hold off a switching into normal operation for a preset delay period.
SNCTST—a synchronism test word to indicate that the internal oscillator drive for inverter is synchronized to the AC input signal.
BADMRK—A word whose value is used to indicate how many successive times the frequency of the primary AC input signal is outside of acceptable limits.
IDBIAS—A word whose value is used to alter phase delay of inverter circuit to prevent power drain from battery during idling of the inverter circuit.
VBIAS—an idle voltage adjustment number added to IDBIAS and BIAS to prevent power drain from battery.
BIAS—An inverter bias word which is the adjusted IDBIAS+VBIAS and which controls inverter circuit signal phase delay.
INCR—a battery charge increment word used to modify BIAS to cause controlled charging of the battery through the inverter circuit.
VSYMM—an inverter symmetry word used to correct current imbalances in inverter switching devices.
DELCOR—the delay words DELAYH and DELAYL with the symmetry correction word VSYMM added thereto.
CMPSAV—a temporary word stored from counter zero read from the counter at the input AC zero crossing. Purpose of this word is to compute comb function of routine four and determine frequency range of primary AC input signal.
VBAT—a word representing the voltage magnitude of the battery.
OUTC—a word representing the current output magnitude of the power supply.
MINDEL—a number to establish a minimum delay number for the inverter signal phase delay.
NEGMIN—the twos complement word of the minimum delay word MINDEL.
INVDEL—an inverter start up delay word used in routine six to delay inverter start up to allow contact bounce to dissipate.
INTEMP—a temporary storage word for the present input voltage sensed to allow a selection of the peak value for display.
REGMON—a word representing the DC monitor's VOM value inside the load switch to test the ferroresonant regulator.
OPTION—the power supply option identity word.
V2CNT—a word representing the number of tests in which battery voltage was determined to be unsatisfactory.
$\phi_1$—a square wave derived from and in phase with the primary input AC voltage.
$\phi_2$—a square wave representing the phase of the inverter drive signal. It is normally synchronized with $\phi_1$ and with a controlled delay therefrom.
$\phi_3$—a word bit identifying the signal phase of the internally generated frequency source. In the normal mode of operation, $\phi_2$ lags behind $\phi_3$ so as to idle the inverter and in the internal mode of operation, $\phi_2$ is coincident with $\phi_3$.
$\phi_4$—a square wave derived from and in phase with the output AC voltage.
61A8—a hexadecimal value word stored in a counter which at the frequency of operation of the central controller takes 8:33 milliseconds to count down.

$CX_2$—a binary signal indicating the acceptability of the peak amplitude of the primary AC input voltage. If it is high, the AC signal level is acceptable and if it is low, the AC signal is not acceptable.

The following words appear in peripheral interface chips which are addressed in the same manner as a memory location. Ports A, B and C designate the words which appear on output ports provided by the chip 309.

| Port A | provides an 8 bit output word to control various outside circuits; wherein |
|---|---|
| bits 0 and 1 | control the relative phases of the inverter switching drive; |
| bit 2 | controls the load switch 271; |
| bit 3 | controls the bypass switch 208; |
| bit 4 | controls the line switch 212; and |
| bits 5, 6 and 7 | control the indexing of the multiplexer 307. |
| Port B | provides an 8 bit output word to control outside circuits; wherein |
| bit 0 | controls blanking of a digital display 325; |
| bit 1 | is a multiplexer control bit; |
| bit 2 | is a bit for presetting a symmetry correcting integrator of the inverter; |
| bit 3 | is a bit to control polarity of integrator input amplifier; |
| bit 4 | controls a contactor which connects inverter circuit 211 to battery 209; |
| bit 5 | provides an indication of the $CX_2$ state; |
| bit 6 | indicates if primary AC signal is unacceptable; and |
| bit 7 | resets flip-flops driving the inverter switches. |
| Port C | provides an 8 bit word in which 4 bits are inputs from sensing circuits and 4 bits are output control bits. |

The initialization routine flow chart disclosed in FIG. 6 is entered through entry terminal symbol 1001. A subsequent process symbol 1002 presets some of the control and status words which are defined above to reasonable values representative of proper operating parameters of the power supply. Control and status words in memory including: IDBIAS, BIAS are preset as indicated by process symbol 1002 so that the power supply starts the inverter circuit operating from a common fixed phase delay each time power processing is initiated. An inverter delay timer (i.e., counter three) is actuated in process symbol 1004 by applying the set up mode words to it to place it in a predetermined operational mode so it is ready for use in subsequent routines. While not shown in the flow chart, the other interrupt routines are masked in process symbol 1004 so they do not interrupt further initialization instructions. Such masking while not shown is also included in many of the following interrupt routines for the same purpose.

Process symbol 1006 represents an instruction that presets the control words in memory as shown therein to reasonable values so that the start up routine may proceed reasonably.

In the process symbol 1008, the proper mode word is written into the programmable timer to preset the counter one into its proper operating mode to produce the proper output waveforms. Likewise, the subsequent instructions of process symbol 1010 provide the proper mode words to set up the prioritized interrupt controller.

Decision symbol 1012 represents instructions to determine the status of the signal $CX_2$ which is a signal representing the overall amplitude acceptability status of the primary AC input signal and has been provided by the above-described diagnostic routines. If its overall amplitude is acceptable, then signal $CX_2$ is high; if it is not acceptable, then signal $CX_2$ is low. If $CX_2$ is high, the routine continues to process symbol 1014 whose instructions preset the word EF HEX in output port location B to reflect reasonable starting values of these conditions and permit immediate power processing. If, on the other hand, $CX_2$ is low, the instruction routine proceeds to the instructions represented by process symbol 1028. Here, the output ports A and B are preset to certain word values OC and CF HEX to reflect this condition as defined by decision symbol 1012. The words in output ports A and B described above are used to control power train connecting switches, a multiplex control signal, sensors and display to the analog-to-digital converter and various power signal conditions. In summary, if $CX_2$ is high, then preset words are used to establish a normal mode connections in the power train and if $CX_2$ is low, the preset words are used to establish an alternative internal mode of operation.

Following the presetting of the words in output ports A and B for normal mode operation of the power supply, the instructions of decision symbol 1016 determines if the power supply includes a bypass option. If the power train includes a bypass mode option, the instruction routine continues to instructions of process symbol 1018 and presets words in port A; and the words STATWD and BYPCNT are also preset, as indicated, to reflect this power train option existence. If the power train does not have the bypass option, the instruction routine continues to the instructions of process symbol 1020 to preset port A and STATWD appropriately to IC and CO HEX.

The instruction routine continues to the process symbol 1022 in which the word SNCTST is preset followed by decision symbol 1024 which determines if $\phi_1$ is high. $\phi_1$'s polarity tracks the polarity of the AC input signal and if $\phi_1$ is high, the AC input signal is positive. If $\phi_1$ is low, the instructions of symbol 1024 recycle via a feedback loop of flow path 1025 until $\phi_1$ is found to be high so that the start of the instruction routine to follow will be properly synchronized with the proper AC input signal polarity. Words WAITBP and WAITNM are preset in subsequent process symbol 1026 and serve to provide inhibitary count down words to inhibit rapid switching by the power supply from one mode of operation to another.

Both symbols 1026 and 1028 have flow paths which proceed directly to process symbol 1030, in which DELAY is set to MINDEL to establish a starting delay value for operation of the inverter circuit. Counter zero of the programmable interval timer is set to its proper operating mode of generating square waves by entering the proper control mode word and count down word.

Counter zero is included as a part of the programmable interval timer 305 and has a word storage register in which the word entered is counted down in the counter followed automatically by a subsequent count down of a word entered in the register. During count down of the word, a second word may be entered into the register; hence a single cycle of count down may count down two different words in each half cycle. This operating feature is advantageously utilized in monitoring the frequency of the AC input signal as described below. Hence in process symbol 1030, counter zero is first preset with a word 6600H that when counted down twice at the clock frequency provides counts down in an interval equal to a half period of a frequency less than a 60 Hz signal. As soon as count down commences, a follow up word 61A8H is inserted subsequently in the register at the half cycle mark which represents an interval equal to a half period of a 60 Hz signal. So if a count down of 6600H is followed by a count down of 61A8H, the total count down interval for a full cycle equals the period of a 58 Hz signal. On the other hand, two successive count downs of 61A8H produces a count down interval equaling the period of a 60 Hz signal. The precise reason for this counting arrangement is explained in the following description of routine zero and routine one which interact with each other as described below.

Upon the completion of initialization in the return terminal symbol 1032, the diagnostic routines continue and the actual power processing routine operative on an interrupt basis begins.

DESCRIPTIONS OF INTERRUPT DRIVEN ROUTINES

Figure 15:
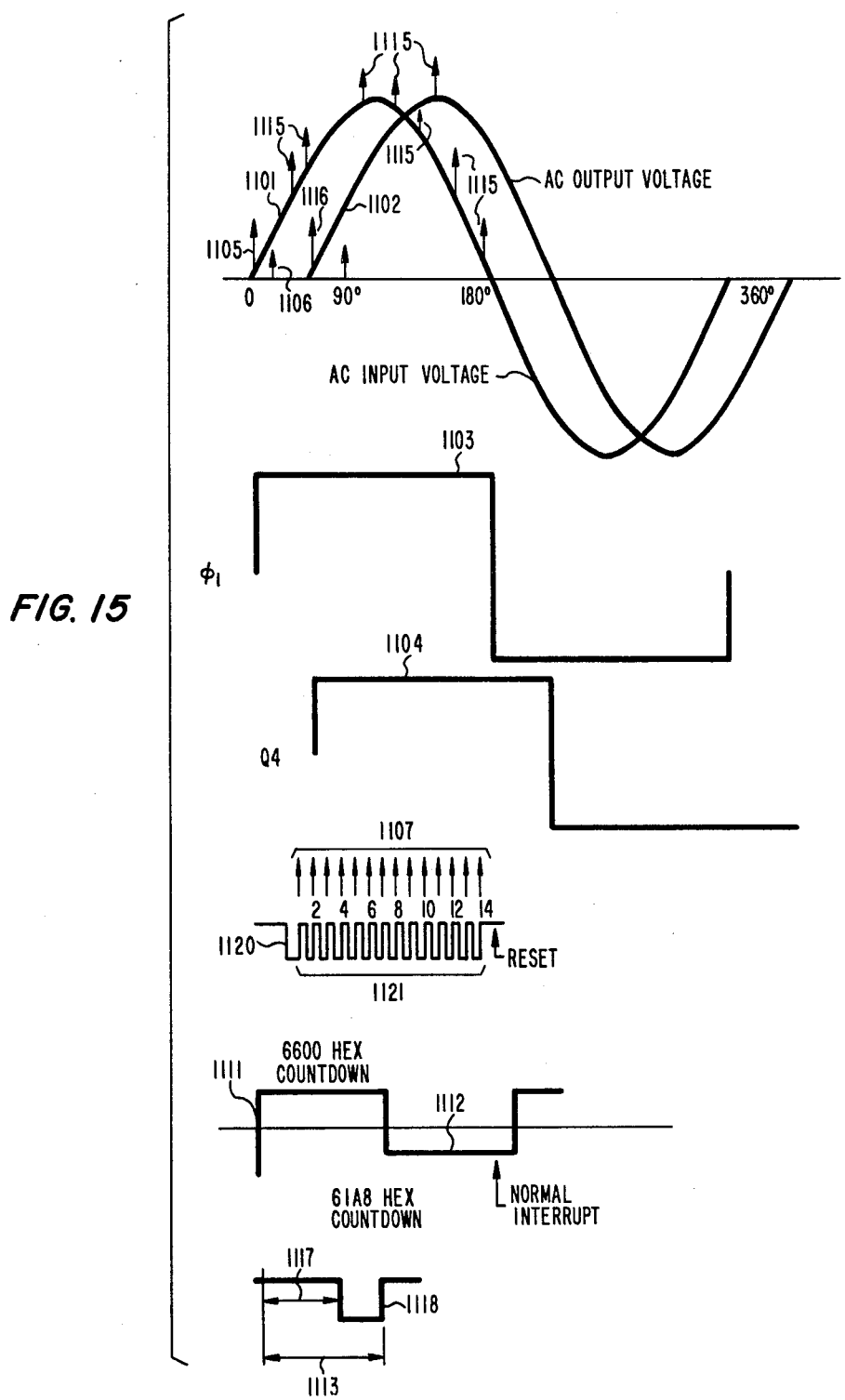
FIG. 15 is a waveform diagram of selected input, output and control signal designating the occurrence times of the various power processing routines.

After the completion of the initialization routine, the central processor is in condition to begin responding to the various real time control interrupt routines while continuing the running diagnostic routines during idle intervals. The interrupt routine having the highest priority is routine zero, since its triggering signal input is applied to the highest priority input zero of the prioritized interrupt chip. An important function of routine zero is the setting up of counter one so its pulse output frequency is exactly 1/16th of the frequency of the primary AC voltage. Counter one's output is used in routine four to precisely determine the various signal sampling intervals. Routine zero is also closely related to and closely interacts with the routine one as described below. The normal times at which routines one and zero occur are related to a zero crossing of the input AC voltage signal 1101 and to the expiration of count down in counter zero as shown in FIG. 15 by the interrupt arrows 1105 and 1106, respectively. Routine zero is periodically called in response to the termination of a complete count down cycle in counter zero of the programmable interval timer. This normally occurs at a time after routine one has completed its response to the AC input voltage zero crossing. The most probable time of occurrence of routine zero with respect to the primary AC input voltage may be ascertained by reference to FIG. 15, wherein the interrupt calling the routine zero responsive to counter zero occurs at the time shown by the arrow 1106. This normally occurs after the zero crossing of the primary AC voltage signal, which provides the triggering signal to call the interrupt of routine one at the time shown by arrow 1105. Routines zero and one are interactive with each other and operate in conjunction with one another to monitor and determine acceptability of the frequency of the primary AC input signal and in part to achieve synchronization of the operation of the inverter circuit with the primary AC input signal.

Routine zero, as indicated above, is always called in response to termination of the count down of the counter zero in the programmable interval timer. This can occur in two different ways. Normally, as described above, the counter zero is programmed with a first number (identified as 6600H above) so that the time of a complete count down of that word interval twice in a row is equal to the corresponding period of a 58 Hz sinusoidal signal. However, under normal circumstances, the word 6600H is not counted down two consecutive times. This first number is followed by 61A8H which is counted down subsequent to the 6600H value, when both numbers are consecutively and completely counted down, the termination of this total count down automatically calls for routine zero. Thus, during normal operating conditions when the AC signal is acceptable, the counter zero has not completed its count down of the two consecutive stored counts when the zero crossing of the primary AC input signal occurs. By reading the remaining count left therein at the zero crossing count down, the AC input frequency can be accurately calculated by one of the instruction routines and various control routines and words for other applications based on this calculated frequency can be, in turn, calculated. This count remainder, for example, provides a basis for calculating a timed interval approximately equal to a period of 22 ½ degrees of the primary AC input signal used to generate the comb pulse waveform of counter one whose pulses occur at 1/16th the frequency of the primary AC input voltage. This generation of timing intervals shown by arrow 1107 in FIG. 15, which correspond to the leading edges of teeth pulses of the comb waveform 1120, determine the sampling intervals at which various power signals and states of the power supply are monitored by other instruction routines below. A zero crossing initiates routine one which immediately resets counter zero with the two aforedescribed standard count down words to begin a subsequent count down.

Figure 7:
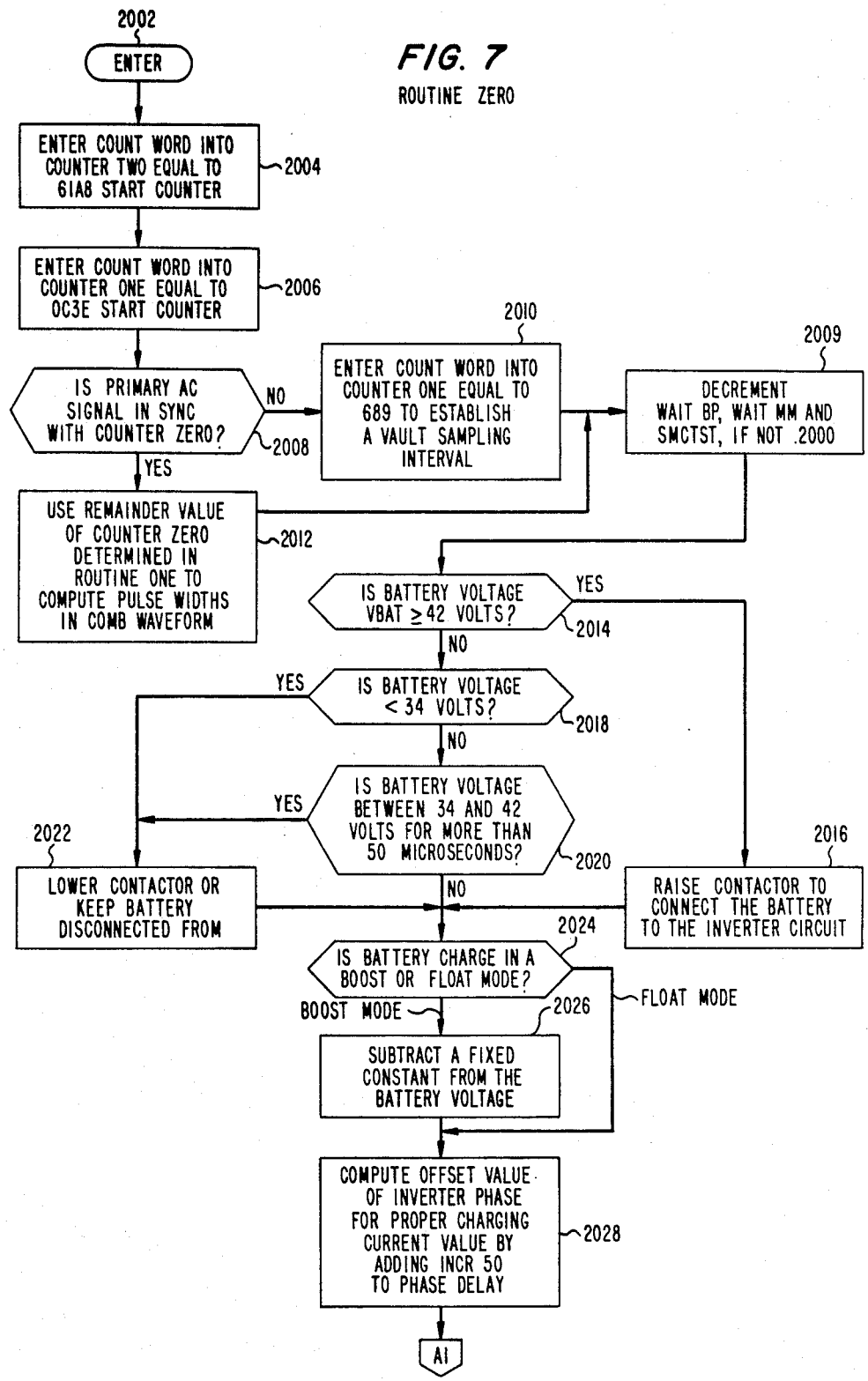
Figure 8:
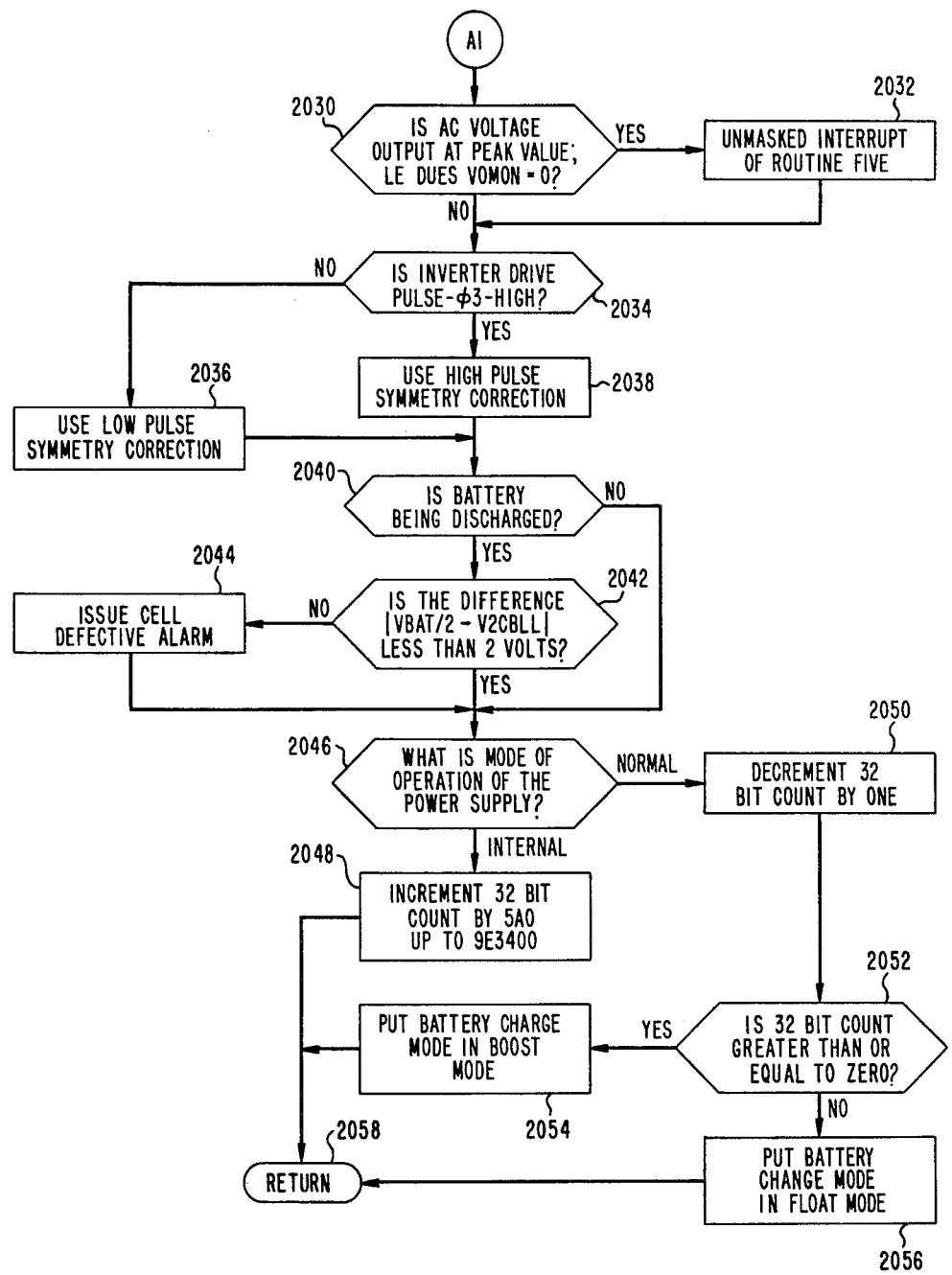

During the occurrence of the instruction routine zero shown in FIGS. 7 and 8, further functions are performed such as storing the proper count words in counter two of the programmable interval timer, checking battery voltage and computing battery charging requirements. Instruction routine zero, as shown in FIGS. 7 and 8, is entered in terminal symbol 2002 by an interrupt request generated in response to an output of counter zero whenever the count down in counter zero is terminated by exhaustion of the count stored therein. If routine one is still active, the calling of routine zero in response to counter zero will be delayed until routine one is complete.

The first function of routine zero as shown by process symbol 2004 is to insert a word value 61A8 Hex into counter two of the programmable interval timer and initiate count down thereof immediately. This word when counted down twice at predetermined clock rate in accord with the operating characteristics of the programmable interval timer provides a timed interval which is equal to the period of a 60 Hz sinusoidal signal. Counter two is used to establish the phase delay at which the inverter circuit is driven in the normal mode relative to the input signal. Counter two starts counting as soon as the word value is inserted or loaded into its register. It continues counting down until a zero crossing of the output AC voltage occurs when counting is halted in response to the disabling gate 320 shown in FIG. 3 which is triggered by the zero crossing.

Counter one is initially preset to count word OC3E Hex in the subsequent process symbol 2006. This value, arrived at experimentally, establishes a first tooth pulse interval at the output of counter one equalling approximately $22\frac{1}{2}°$ with respect to the zero crossing of the input AC voltage. Subsequent tooth pulses, that are used to establish signal sampling intervals, are calculated to have a duration from pulse-to-pulse equalling $11\frac{1}{4}°$ of the period of the actual AC input signal. Routine four, which is called by the comb waveform, has a total of fourteen sampling intervals that begin at $22\frac{1}{2}°$ and terminate at $168\frac{3}{4}°$ in each cycle of the primary AC input voltage. Since the number OC3E is inserted after the actual zero crossing, it must be determined experimentally so it expires at the desired $22\frac{1}{2}°$ of the input AC voltage. The computing of the subsequent count words to establish the $11\frac{1}{4}°$ intervals is computed later in routine zero as described below.

Instructions of decision symbol 2008 determine if the primary AC signal is in synchronism with the program generated sampling interval as determined by routine one, and in particular that a zero crossing of the input AC voltage has recently occurred. This decision is performed by checking the word SNCTST stored in memory. The word SNCTST is established in the below described routine one and stored in memory. Routine one sets the word SNCTST equal to two whenever it judges the primary AC input voltage frequency to be satisfactory. Routine zero immediately decrements this word to one, hence it is apparent if the primary AC input is not in sync and the counter zero is free running, SNCTST will be decremented to zero indicating to routine zero that the program is not in synchronism with the primary AC input.

As described above, counter one generates a comb waveform, which is shown as waveform 1120 in FIG. 15, and which establishes the sampling intervals at which various power train signals are sensed. These sampling intervals must be coincident with various specific degree locations of the sinusoidal primary AC input voltage signal, in order that the stored amplitude to which this signal is compared for acceptability will be accurate with respect to the instantaneous signal amplitude sampled. Hence if the primary signal is actually in sync with counter one, both are operating at a common frequency and the computed arrangement of sampling intervals, which was established in routine one may be properly used to compute a comb width number, that is, to properly locate the sampling times at precise degree locations of the primary AC input signal. The number computed for entry into the counter one is exactly 1/16 the previous half cycle length as determined in routine one when the residue in counter zero is read at a zero crossing.

A decision by the instruction in symbol decision 2008 determines if the counter zero is in synchronism with the primary AC signal. It does this, as described above, by looking at word SNCTST whose value is determined in routine one as described below. If counter zero is not in synchronism with the primary AC signal, there is no remainder count available to compute the comb waveform, so the instruction routine proceeds to instructions of process symbol 2010 to establish a default comb width value for the sampling intervals which utilizes a standard 60 cycle value irrespective of the actual primary AC input signal frequency.

If counter zero is in synchronism with the primary AC signal, the instruction routine zero proceeds to instructions of process symbol 2012 which utilizes a value read from counter zero in the instruction routine one just completed as described herein which value reflects the actual frequency of the primary AC input signal. This count value is converted into a count that determines the width of teeth pulses 1121 in the comb waveform 1120 in FIG. 15. Computation is performed by comparing the count read from counter zero with a table of count values which establishes a conversion between the count values and a comb width count controlling the duration of the teeth pulses. When the comb width count value is established, counter one repetitively puts out teeth pulses for 13 successive slots as described hereinbelow.

Instructions following process symbols 2010 or 2012 go to process symbol 2009 whose instructions operate to decrement three words contained in memory unless these words are already zero. One of the words is SNCTST, which as described above is used to indicate if the primary AC signal is in synchronism with counter zero. The word WAITNM is a word in memory which, as described in the above definitions, gets set at change of operating mode transitions to some appropriate value and is operative to inhibit further transitions from intervals to normal mode until it has been decremented to zero. WAITBP is another similar word which prevents transitions to a bypass mode until it is decremented to zero. Following decrementing of these words, instruction routine zero proceeds to decision symbol 2014.

Instructions of subsequent decision symbol 2014 are concerned with determining whether the battery voltage is acceptable and specifically determines in the illustrative embodiment herein if the battery voltage is equal to or greater than its minimum acceptable value of 42 volts. The value of 42 volts utilized in the instruction routine is intended to be illustrative of an actual embodiment and is not intended to be limiting. The value of this voltage in this embodiment is critical and is determinative of whether the battery is to be connected to the inverter circuit. If, indeed, the battery voltage is determined to be acceptable (i.e., $\geq 42$ volts) the subsequent instruction, shown in process symbol 2016, raises or maintains raised a contactor which connects the battery to the inverter circuit.

Should the battery voltage, however, be less than its minimum acceptable value (i.e., $<42$ volts), it probably has discharged when it was previously connected to the inverter circuit and so the instruction routine must determine whether this discharge is permanent or a temporary phenomenon due to a momentary short circuit within the battery which protective devices of the battery will clear momentarily. Hence if the battery voltage is determined to be less than a second preset minimum threshold value by the instructions of the decision symbol 2018, the battery is kept disconnected or positively disconnected from the inverter circuit by lowering the contactor, as instructed by the subsequent process symbol 2022. If, however, the battery is between the threshold value (i.e., 34 volts) and its minimum value, (i.e., 42 volts) the instruction routine proceeds from decision symbol 2018 to decision symbol 2020 whose instructions determine whether the battery voltage has been within that range for more than 50 milliseconds; a value which has been determined empirically as a reasonable time for an internal fault to clear. If it has been within that range for more than 50 milliseconds, the instruction routine proceeds through the process symbol 2022 to lower the contactor so that the battery is disconnected from the inverter circuit.

If it has not been within this voltage range for more than 50 milliseconds, the instruction routine continues to the decision symbol 2024 on the assumption that the battery voltage is acceptable. The instructions of decision symbol 2024 determine whether the current battery charging mode is in a boost mode or float mode. The selection of one of these two modes of charging is determined by the past power drain history of the battery in supplying power to the inverter and the load and is controlled in the subsequent instructions in routine zero. If a long time interval has elapsed since the battery was drained or called upon to supply power, the battery may be charged in a float mode. If, however, the battery has recently been drained or called upon to supply power through the inverter, it is charged in the boost mode, which calls for a higher voltage for a given charging level of the battery than that supplied in the float mode. This voltage value is determined by reference to a table stored in the memory which, in affect, establishes a relationship between the existing battery voltage and the charging current in each of the two modes of charging. The charging of the battery is actually effected in the power supply by adjusting the inverter circuit signal phase angle at which the switching devices are triggered relative to the primary AC input signal. Whether or not the boost or float mode is operative is determined by examining the word STATWD which, in turn, has the appropriate indicating bit determined at the end of routine zero as described below.

If in decision symbol 2024 it is determined that the battery is charging in a float mode, the instruction routines proceeds directly to process block 2028, where the charging current level for the battery is determined from the look up table in accordance with the requirements of a float mode. If, however, the instruction in decision symbol 2024 indicate that charging is in the boost mode, the instruction routine proceeds to process symbol 2026 which instruction subtracts a fixed constant from the battery voltage to find a new value of inverter firing angle correction in the table which defines the relation in the boost mode between the battery voltage and the desired charging current.

Then by using this correction value, the instruction routine computes the value to which the inverter phase must be set to provide for the proper current charging of the battery. This phase set value computation is accomplished by adding a number INCR to the inverter circuit phase delay number, which is derived in routine five, to achieve the desired battery charging. INCR is determined from a table look up process similar to the above table look up process.

Instructions of a subsequent decision symbol 2030 determine if the AC output voltage of the power supply is at its peak value. The AC output voltage of the power supply is monitored for proper amplitude by measuring its peak value periodically, and this measurement is normally performed during interrupt routine four as described below. However, inasmuch as the phase angle between the primary AC input signal and the AC output signal can vary from zero to 90 degrees in phase difference, the peak could theoretically occur at a time when routine four is not immediately operative. Since it is important that this peak value be measured exactly, an inquiry as to the status of the AC output signal peak is inserted into routine zero so that should the peak occur while routine zero is operating, the AC output signal peak value can be measured immediately. If indeed the AC output signal is at its peak value, interrupt five is immediately unmasked in process symbol 2032 so that it will be interruptible at the next AC output signal zero crossing. Routine five is normally invoked by output zero crossings and is operative to control the firing of switching devices of the inverter circuit within a minimum angle to 90° of the output AC signal. As soon as the zero crossing occurs, the interrupt for routine five is masked to prevent ringing response and is unmasked 90° later to concur with the output peak. Hence when a peak of the AC output voltage occurs before 90° has elapsed, interrupt five is immediately unmasked.

If the AC output signal is not at its peak value at this moment, the instruction routine zero moves immediately to instructions of decision symbol 2034 which determines if the counter supplying $\phi_3$ which is synchronous with the signal driving the inverter circuit has a high pulse or a low pulse output. This determines which phase state the inverter circuit is in.

Normally, the differential in current flowing through the two switching devices of the inverter is measured, and depending upon which phase the inverter is in, a symmetry correction offset value is applied to modify the drive pulses applied to the switching devices so that current conduction in the alternating switching devices is equalized. Hence if the pulse is low, the symmetry correction of process symbol 2036 is utilized, whereas if the pulse is high, the symmetry correction of process symbol 2038 is utilized. Since the art of symmetry correction is well-known in the art, the techniques used herein are not discussed in detail.

Upon termination of the symmetry correction adjustment step, the battery is further checked to see if it is functioning properly. The instructions of decision symbol 2040 determine if the battery is being discharged, that is, if it is supplying current to power the load or inverter dissipation. If it is not, the instruction routine proceeds immediately to the next decision symbol function 2046. However, if it is being discharged, an immediate subsequent instruction of decision symbol 2042 asks if the measured battery voltage divided by half is approximately equal to the voltage across each half of the battery. If the voltage across two halves of the battery both approximately equal half of the total battery voltage, it is highly probable that all the cells in each half of the battery are functioning properly and again, the instruction routine proceeds to the next operation of the routine at decision symbol 2046 discussed below. If, however, half the battery voltage does not approximately equal the voltage of half the battery cells within at least two volts, the instruction routine proceeds to process symbol 2044 to issue a defective cell alarm signal.

The final processes of the instruction routine zero determine according to specific rules whether to place the battery in a boost or float mode of battery charging. Due to the nature of the physical characteristics of the battery, should a current drain of the battery occur, the battery must be charged for a lengthy period of time, relative to the period of discharge. In order to control the proper recharging mode for these conditions, a 32 bit word is inserted into the memory whose value determines the recharging mode selected. This 32 bit word is decremented by one during recharging periods and incremented by the value 5AOH whenever the battery is being drained of current to supply power to the output. Hence the initial decision symbol 2046 asks in what mode of operation, normal or internal, is the power supply currently operating. If it is operating in the internal mode, that is, the battery is being drained to supply power to the output load, process symbol 2048 starts incrementing the 32 bit count in memory by increments of 5AOH each time routine zero is called which continues up to a maximum value of 9E3400 as long as the battery is supplying power to the load. This 32 bit count is utilized to determine the length of time of recharging when the power supply returns to normal operation. If decision symbol 2046 determines that the power supply is in its normal mode, that is, the output power is supplied by the primary AC input, then every time this decision occurs by the operation of routine zero, the 32 bit count is decremented by one, and it is continuously decremented each time routine zero is called. If the 32 bit counter is greater than zero, as determined by the routine decision symbol 2052 battery recharging is continued in the boost mode as instructed by process symbol 2054. However, when the 32 bit count has been fully decremented to zero, it is apparent that the battery has been charged long enough to restore the power lost by the current drain during the internal modes of operation. The battery may now be charged in the float mode as instructed by process symbol 2056 which keeps it at its proper voltage but without supplying excessive power to the battery.

Upon the complete termination of what mode to place the battery recharging in, all the interrupts are reenabled and routine zero terminates at termination symbol 2058.

Figure 9:
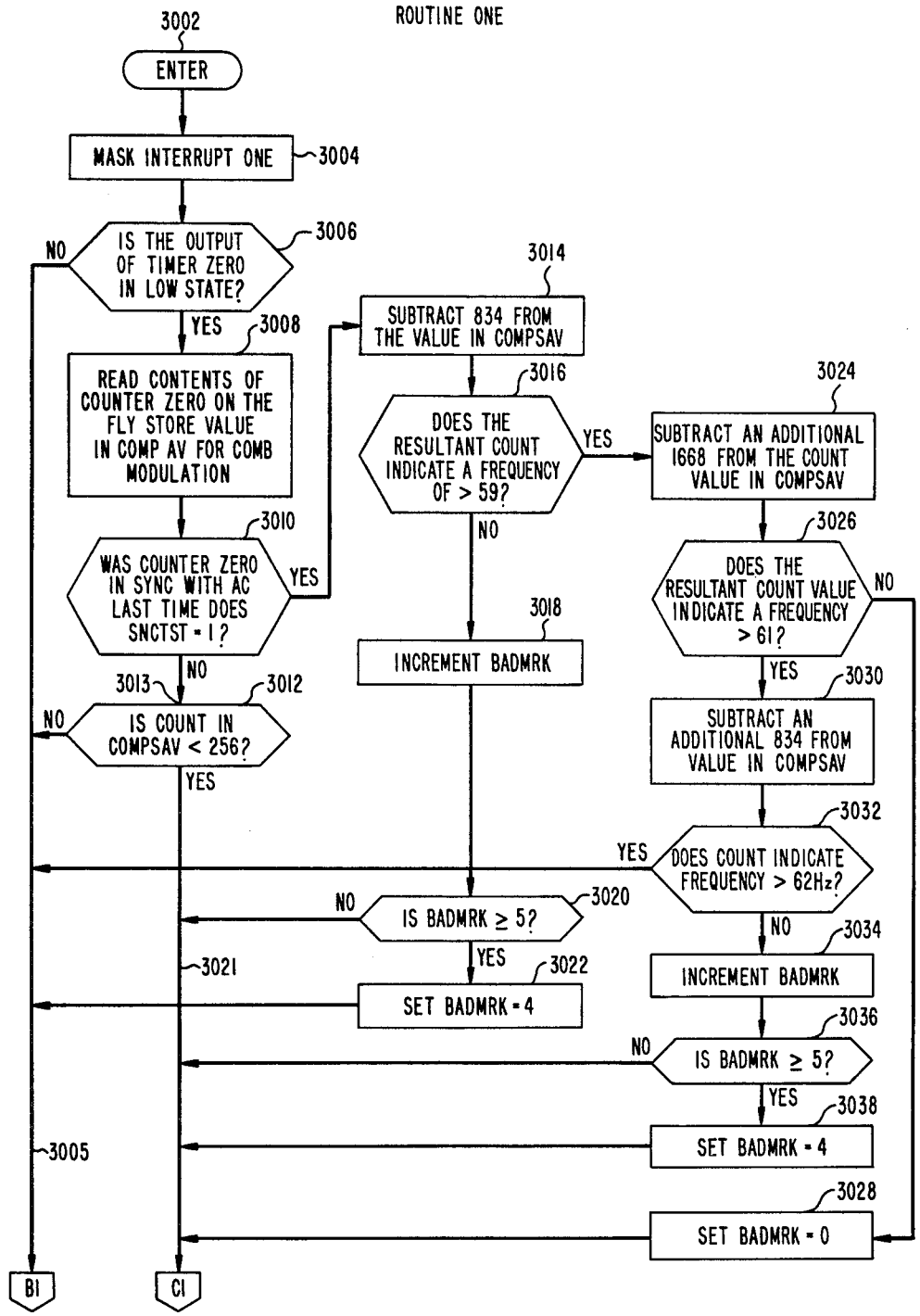
Figure 10:
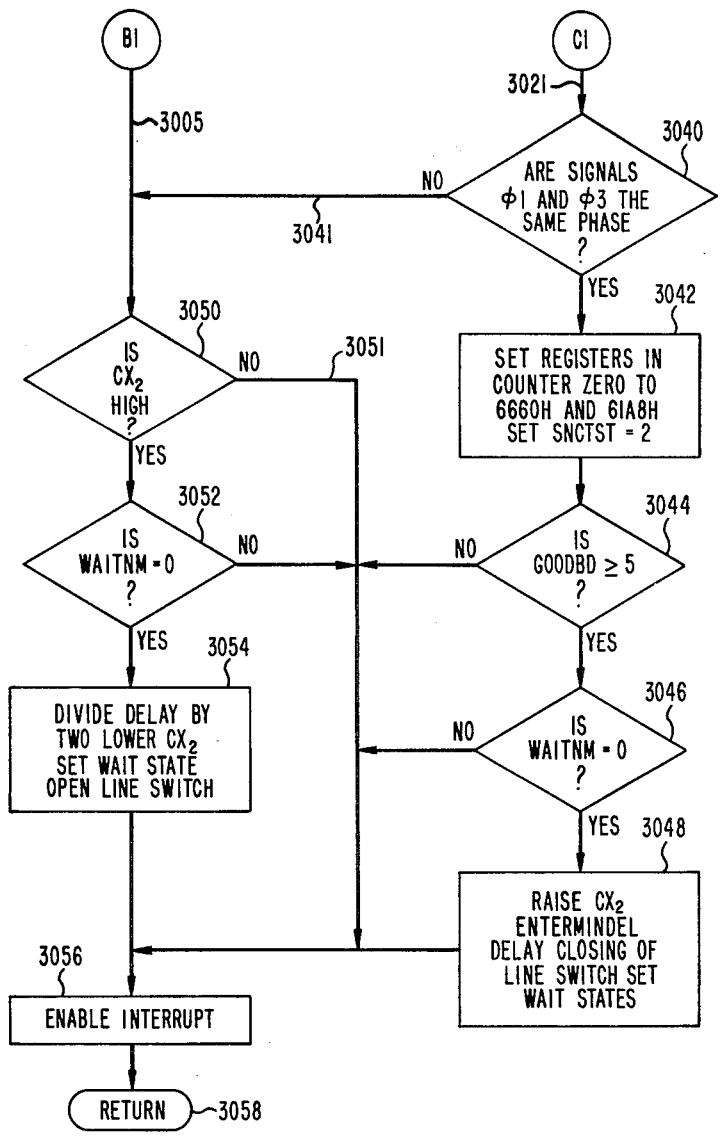

The subsequent routine one shown in FIGS. 9 and 10 and next in the priority scale to routine zero is initiated in response to a zero crossing of the primary AC input voltage 1101 at arrow 1105, as shown in the waveform diagram in FIG. 15. As discussed hereinabove, routine zero and routine one interact with each other to monitor the frequency of the primary AC signal and synchronize the running of the inverter circuits with the primary AC signal. The AC zero crossing of the primary AC input voltage causes a trigger signal to be applied to the prioritized interrupt chip and initiates the calling of routine one at input terminal symbol 3002 shown in FIG. 9.

The first response of routine one inhibits an immediate recalling of itself as shown in the process symbol 3004, as shown in FIG. 9, and hence avoids responding to multiple zero crossings of the input AC voltage due to ringing transients or other noise of the primary AC voltage at the zero crossing. Instruction routine one now proceeds to perform frequency deviation testing. A subsequent instruction of decision symbol 3006 determines the output state of the pulse polarity of counter zero. Counter zero is counting down a number in its counter to establish a timed interval equal to the half period of a 58 Hz signal when the count down is complete. The particular output of counter zero, due to the operating characteristics of the particular programmable interval timer used, comprises a high state for the first approximately four milliseconds of that interval and a low state for the second approximately four milliseconds of that interval.

This may be readily explained by reference to waveform 1111 and 1112 in FIG. 15 which represents the output of counter zero. As described above, the counter of the programmable interval timer is first set to 6600H and immediately set to 61A8H as soon as count down begins. Hence two different words are counted down in succession. The first word is counted down at the clock rate with a high level pulse output shown by waveform 1111. The second word is counted down immediately following count down of the first word and is accompanied by a low state output of the counter. Hence the determination in process symbol 3006 determines if the count down is at midpoint or near termination of the count. A no answer indicates that less than one half of the total count down interval is complete and hence the zero crossing pulse of the AC input voltage has occurred way off from its proper time.

With a no answer, the instruction process of routine one proceeds, via the flow line 3005, to decision symbol 3050 which functions to determine if the AC input indicator signal $CX_2$ is high or low. $CX_2$ which is derived in the diagnostic routine is a synchronized signal which reflects acceptability of the amplitude of the primary AC input voltage. If $CX_2$ is low, it is obvious that the primary AC input voltage has already been declared unacceptable and the instruction routine one follows flow line 3051 to proceed to return terminal symbol 3058 which terminates routine one. If $CX_2$ is high, the input AC voltage has been acceptable until now and the flow of instruction routine one proceeds to decision symbol 3052 whose instructions determines if WAITNM is equal to zero or not. As explained above in defining WAITNM, it is a word that prevents a transition into normal operation unless it has been decremented. If WAITNM=0, the power supply can be immediately switched into the internal mode and the instruction routine proceeds to process symbol 3054 which reduces the inverter delay by one half to avoid adverse transients at the change over from one mode to another and opens the line switch 212 in FIG. 2. The bit representing $CX_2$ is set to a low state and a wait state is set in which a count down of several half cycles of the input AC voltage is requested before $CX_2$ may be raised again. Instruction routine one is then terminated at termination symbol 3058. Hence an effect of a decision in block 3006 that a count is at its midpoint is to immediately bring about an exit of the routine one without resynchronizing the counter zero.

If the output of counter zero is in its low state as determined by instructions of decision symbol 3006, it is apparent that a sufficient interval of time has passed to permit the count down interval therein to approximately equal the period of the applied primary AC input voltage. If the counter zero is in the proper state, instructions of the subsequent process symbol 3008 read the instantaneous remaining count content of the counter zero without stopping it and store this remaining count value in storage location COMPSAV.

As explained hereinabove, counter zero counts down two 16 bit numbers in succession in which the time interval of count down equals 8.62 milliseconds and an interval equal to an interval of one half of a cycle of a 68 Hz signal. If the frequency of the input AC voltage is greater than 58 Hz, the count remainder read is an accurate representation of its actual frequency. This remaining count value, for example, is equal to zero if the input AC signal frequency is exactly 58 Hz. If its frequency is less than 58 Hz, the line switch will be opened as discussed below. If it is greater than 58 Hz, the routine one determines if it is with a predefined band in window of frequencies. This remaining count value is identified by its memory location COMPSAV and used in routine zero as described above for the computation of the sampling intervals of the modulated comb pulse. This count value COMPSAV is further used in this routine one to determine the range of frequency deviation of the input signal.

The flow line of routine one proceeds to decision symbol 3010 whose instruction checks the value of the word SNCTST. If it equals one, the counter zero was in synchronism with the primary AC voltage signal during the last occurrence of routine one and hence instruction routine proceeds via flow line 3011. If, however, SNCTST equals zero, the primary AC voltage signal was not in synchronism with counter zero and the instruction routine proceeds, via flow line 3013 to decision symbol 3012, which looks at the number stored in COMPSAV and determines if its value is less 256. If it is less than 256, this indicates that the zero crossing of the primary AC voltage signal occurred very close to the expiration of the count in counter zero, and if it has been out of synchronism with the primary AC input signal, it is now close enough to be brought into synchronism without causing disturbing signal transients and hence a yes answer causes instruction routine to proceed, via flow line 3021, to the decision symbol 3040 which investigates if the primary AC signal $\phi_1$ and the inverter drive signal $\phi_2$ are in phase coincidence. If they are in close phase coincidence, the counter zero may be started in synchronism with the primary AC signal or $\phi_1$ and accordingly, in process symbol 3042, the registers associated with counter zero are preset in sequence with the words 6600H and 61A8H and SNCTST is set equal to 2.

The subsequent decision symbol 3044 checks the value of GOODBD a word in memory whose value indicates if the primary AC amplitude is acceptable. A number $\geq 5$ indicates that the input AC amplitude is acceptable and the next decision symbol 3046 checks the value of WAITNM, a word that indicates whether this time is appropriate to effect a synchronism of the counter and the input AC. If it is appropriate, that is WAITNM=0, the instruction routine zero proceeds to process symbol 3048 which sets predetermined states to permit synchronism such as raising $CX_2$ to its high value, entering a MINDEL to control the inverter circuit signal phase and setting the wait states including words WAITNM and WAITBP and then proceeding to exit routine one at terminal symbol 3058.

Should the decision by instructions in decision symbol 3040 yield a no answer, instruction routine one proceeds by flow line 3005 to decision symbol 3050, whose processes are discussed below. A no answer to either decision symbol 3044 or 3046 also causes the instruction routine to proceed to exit terminal 3058.

If the value of SNCTST examined in decision symbol 3010 indicates that counter zero was in synchronism with the primary AC signal, the instruction routine one proceeds along flow line 3011 to a frequency checking subroutine which begins in process symbol 3014, and whose instructions determine if the frequency of the primary AC input signal is currently operating in a specific frequency range between 58 to 62 Hz and between 59 and 61 Hz. It accomplishes this by determining if the remaining count read on the fly determined in process symbol 3008 falls within predefined limit numbers. If the remaining count is between the outer limit numbers, the frequency of the primary AC signal is definitely between 58 and 62 Hz. The subsequent frequency checking is concerned with determining if this signal frequency is between 59 and 61 Hz. If it is, the signal frequency is unconditionally acceptable for power processing by the power supply. If it falls in the 58-59 Hz or the 61-62 Hz ranges designated as outer ranges, it is acceptable only if it falls within these ranges only temporarily or less than four times in succession. So the instruction routine checks to see if it falls within these outer ranges for greater than a fixed number of successive intervals, set herein as four successive checking intervals. If it falls within these outer ranges of frequency in more than four successive intervals, the primary AC input signal frequency is deemed to be unacceptable.

If the SNCTST word checked in decision symbol 3010 is one indicating that the counter zero has been in phase with the primary AC, the flow line of the instruction routine one proceeds along line 3011 to process symbol 3014 which subtracts a fixed value 834 from the count value in COMPSAV, and in decision symbol 3016, determines from whether the answer is negative or not if the signal frequency exceeds 59 Hz. These fixed count values are illustrative of a value pertinent to an actual embodiment only and are not intended to limit the scope of the invention. If decision block 3016 determines that the resultant value is negative (a yes answer), than the frequency of the primary AC signal is greater than 59 Hz, and the instruction routine one proceeds to process symbol 3024, which subtracts a fixed value 1668 from the count in COMPSAV and determines in the following decision symbol 3026 if this resultant value is negative (a yes answer) which fact indicates that the frequency of the primary AC input signal is greater than 61 Hz.

If the instruction of decision symbol 3016 has determined that the frequency of the AC input signal is not greater than 59 Hz, it must be between 58 and 59 Hz and the instruction routine proceeds to process symbol 3018 which increments a number in memory identified as BADMRK. BADMRK is a word which is periodically altered to reflect not only whether the primary AC input frequency is within acceptable limits but also how often it is either within or without the acceptable limits. Every time the primary AC signal frequency exceeds 61 Hz or is less than 59 Hz, the value of BADMRK is incremented.

If the frequency of the primary AC signal is between 59-61 Hz, BADMRK is set to zero. Hence a decision on the acceptability of the primary AC signal frequency depends upon both the size and frequency of occurrence of a frequency deviation. BACMRK responds to the various decision processes so that when the frequency of the primary AC signal is between 59 and 61 Hz, the primary AC signal frequency is deemed acceptable. Should the frequency of the primary AC signal fall within the range 58-59 or 61-62 Hz, four successive times in a row, the primary AC frequency is determined to be unacceptable based on the magnitude of BADMRK, and the power supply is switched into the internal mode whereby the DC voltage source through the inverter circuit supplies the output power. The incrementing of BADMRK is set up such that should the AC frequency of the primary AC input signal fall below the 58 Hz or above 62 Hz value for a single instance, this single instance is sufficient to transfer control of the power supply into its internal mode. Hence in decision symbol 3016, a determination that the count or frequency of the input AC signal is less than 59 Hz, causes the instruction routine to increment the value BADMRK in process symbol 3018.

After the word BADMRK has been incremented in process symbol 3018, the instruction routine proceeds to decision symbol 3020 which determines if the BADMRK value is greater than or equal to the value five. If it is equal to or greater than five, the instruction routine proceeds to process symbol 3022 which sets BADMRK equal to four and returns to flow line 3005. Flow line 3005 connects to decision symbol 3050 which, in turn, connects to subsequent symbols 3052 and 3054 whose individual action and purposes are described above and which result in an eventual exit from routine one. If BADMRK is not greater than or equal to five, the instruction routine proceeds to flow line 3021. Since BADMRK is not greater than four, the power supply may continue in its normal mode of operation. The instruction routine proceeds by flow line 3021 to decision symbol 3040 which, in combination with subsequent instruction symbols that monitor other conditions, allow the power supply to remain in synchronism with the primary AC signal. If, as discussed above, decision symbol 3016 results in a determination that the frequency is greater than 59 Hz, the instruction routine proceeds via process symbol 3024 to decision symbol 3026 which determines if the frequency is greater than 61 Hz. If the answer is no, the input AC frequency is within an acceptable range, and the BADMRK value is set equal to zero in process symbol 3028 and the instruction routine proceeds to decision symbol 3040. If, however, decision symbol 3026 indicates that the input AC frequency is greater than 61 Hz, the subsequent instruction of process symbol 3030 subtracts 834 from the current value storage location COMPSAV and determines, in decision symbol 3032, if this count indicates the frequency to be greater than 62 Hz. If it is not, BADMRK is incremented in process symbol 3034. Subsequent decision symbol 3036 determines from BADMRK if the input AC frequency has exceeded 61 Hz more than four times in a row. If it has, the instruction routine proceeds immediately, via flow line 3005, to decision symbol 3050 and eventually exits routine one.

After evaluating the BADMRK and determining that the input frequency is acceptable, as described above, the instruction routine one proceeds to decision symbol 3040, which determines if the signal $\phi_1$, derived from the input AC signal, and $\phi_3$, the internally derived frequency source are in phase. $\phi_1$ as shown in FIG. 15 is a square wave derived from and precisely in phase with the primary AC input signal. $\phi_3$ is a square wave signal from which $\phi_2$, the inverter signal, is derived. It must be high when $\phi_1$ is high or else the inverter circuit will be running 180 degrees out of phase with the primary AC signal. If $\phi_1$ and $\phi_3$ are not properly related in phase, the instruction routine proceeds, eventually via flow line 3041, to exit terminal symbol 3058 from routine one.

If instructions of decision symbol 3040 determine that $\phi_1$ and $\phi_3$ are in proper phase relation, subsequent process symbol 3042 then sequentially sets the registers in counter zero to 6600H and 61A8H. The value 6600H is the first value to be counted down in the next cycle followed immediately by a count down of 61A8H, whereby the total count down timed interval equals one half the period of a 58 Hz signal, as discussed hereinabove.

Once these numbers are preset in counter zero, as described in the process symbol 3042, the instruction routine proceeds to decision symbol 3044 which responds to the value of GOODBD a word stored in memory. GOODBD is a word which is set up in the subsequently described instruction routine four and whose value indicates whether the continuing amplitude of the input primary AC signal at various sampling points is within acceptable ranges. If GOODBD's value is greater than or equal to five, then the amplitude of the input AC voltage is acceptable and instruction routine one proceeds to decision symbol 3046. Decision symbol 3046 investigates the value of WAITNM, a word whose value establishes a delay which prevents the power supply from being switched into its normal mode until WAITNM is equal to zero. It is always set when a mode change occurs and prevents an immediate change into another mode so as to prevent frequent changes back and forth from one mode to another should marginal condition prevail. From thence, the instruction routine one proceeds to process symbol 3048, if WAITNM=0, and appropriately raises the signal $CX_2$ to indicate primary AC is good, and establishes a minimum inverter phase delay since the power supply may now switch into its normal mode. It further institutes a time delay to prevent immediate closing of the line switch for 720 half cycles of the input AC voltage to allow credibility of this signal to be established. If the value of GOODBD in decision symbol 3044 indicates that the AC is unacceptable or WAITNM does not equal zero, routine one proceeds to terminal symbol 3058 to exit the routine one.

The operation of the initialization routine and the instruction routines zero and one described above both control and interact with counters zero, one and two to check acceptability of the input AC signal. Counter zero is set up in the initialization state and is permitted to free run if not synchronized to the input AC signal prior to its natural count down termination. Normally, it is reset in response to a zero crossing of the primary AC input signal. As long as the AC input signal is within the acceptable frequency range, counter zero is not timed out since its normal 58 Hz interval is never naturally terminated. Counter zero is restarted by routine one and reset to the 58 Hz count down interval in every half cycle. The remaining value in the counter zero at a zero crossing is used to calculate the frequency range of the input AC signal and the proper timing of sampling intervals used in routine four described below.

Routine zero also sets up counter two and a separate counter three is set up in routine four in time slot 14. Both of these counters are used in combination with the AC output voltage zero crossing in routine five to establish the proper inverter delay time with respect to the primary AC input signal as discussed below.

As has been described, routine zero and one interact together in a novel fashion to determine, in real time, the acceptability of the input primary AC signal frequency and to synchronize the running of the inverter circuit with this signal with a minimum of delay. The actual controls for sampling of the primary AC input signal for proper amplitude and the sampling of various other signal states and amplitudes in the central processor is performed in response to the instructions of routine four. Routine four establishes approximately 13 sampling intervals in any half cycle, half of which are used to sample the amplitude of the primary AC input voltage signal. Routine four also monitors the output AC voltages, the output current and the battery voltage during different sampling intervals. In response to the values of these sampled intervals, it also directs transitions from one mode to another of the power supply and in addition, contains all the timing controls to operate the various bypass switches, line switches, and load switches at the proper points in the AC waveforms so that they do not cause unnecessarily disturbing transients in the output load signal.

Instruction routine four is invoked in response to the individual teeth pulses generated by counter one which normally occur fourteen times in any half cycle of the input AC voltage signal. These various interrupts to measure the amplitude of the input AC voltage are identified as interrupt points 1115 in FIG. 15. The sampling points are carefully adjusted so that any sampling interval occurs at the proper radian measure of the input AC voltage so that comparison with a test value stored in memory produces a correct result. The computation to adjust the comb waveform 1110 in FIG. 15 is performed in routine zero as described above.

Routine four is called by an interrupt when one of the teeth pulses of the comb waveform is applied to an input four of the priority interrupt as shown in FIG. 3, in which, routine four has priority over all routines except routines zero and one responsive to counter zero and the input AC zero crossing, respectively.

Figure 11:
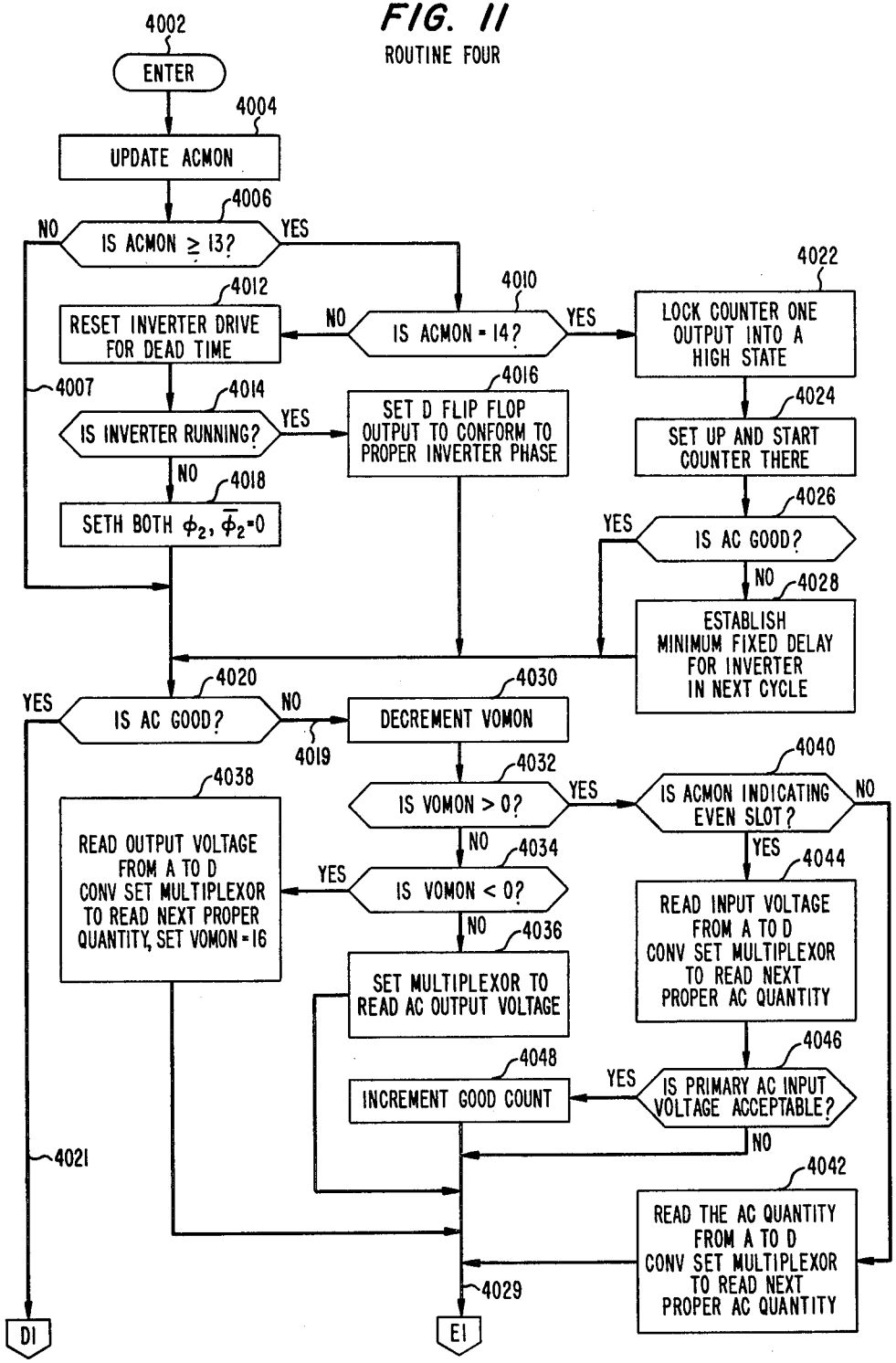
Figure 12:
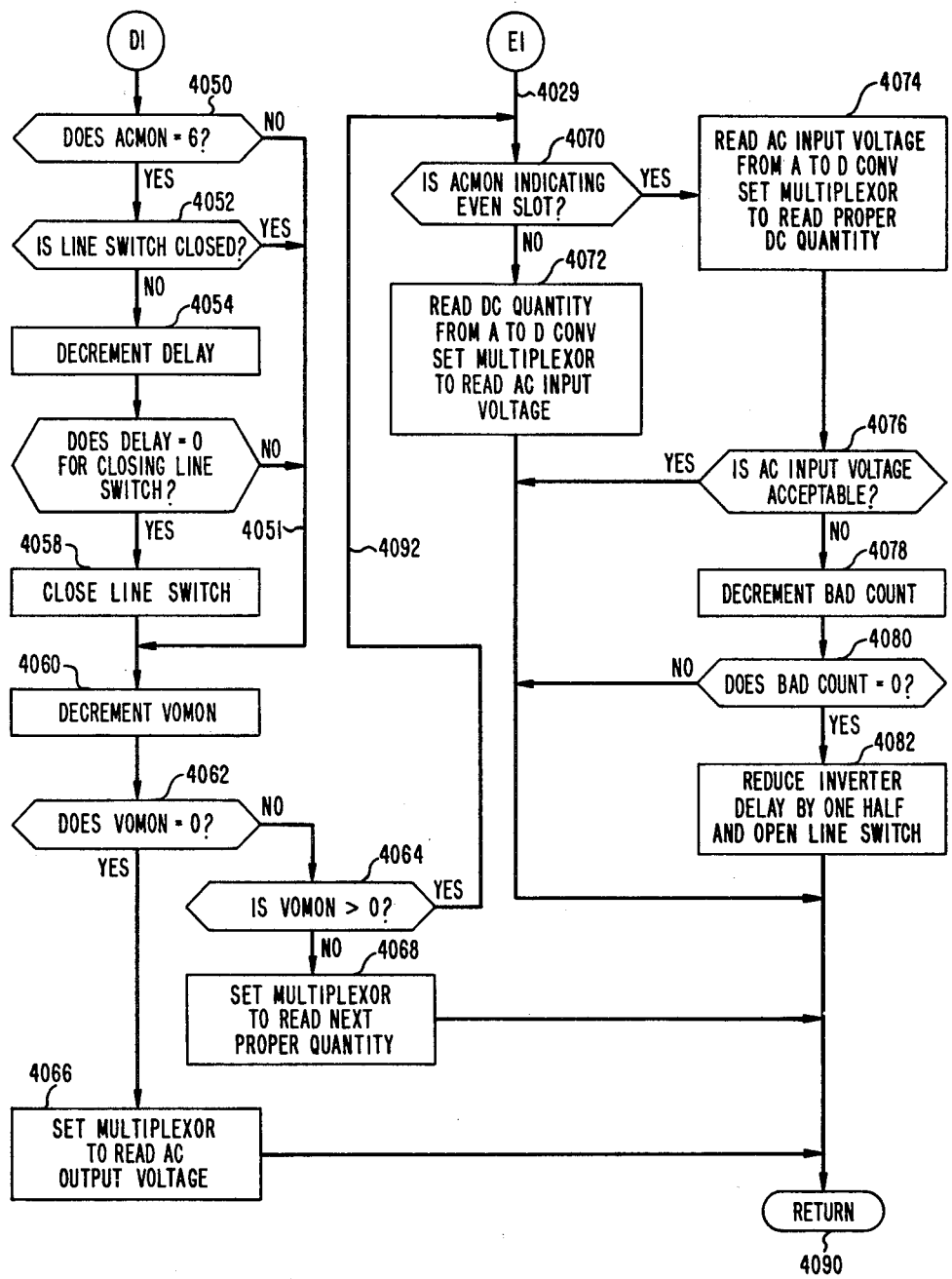

As described above, counter one is set up in routine zero by setting it to generate a first pulse having a duration equal to $22\frac{1}{2}°$ of the input AC signal beyond the zero crossing and then $11\frac{1}{4}°$ pulses for the balance of the half cycle. So routine four is first called at the $22\frac{1}{2}°$ mark and thereafter at intervals of $11\frac{1}{4}°$. Routine four, shown in FIGS. 11 and 12, is entered in entry terminal symbol 4002 and proceeds to process symbol 4004 which increments ACMON. ACMON is a word used to indicate the sampling slot that routine four is in and enable selection of the proper signal sampling subroutine. Hence at each call of routine four, ACMON is incremented to advance the slot identification number from the slot number of the previous execution of routine four. Hence ACMON also identifies the number of the tooth pulse of the comb waveform 1020 shown in FIG. 15 that caused this particular interrupt.

Decision symbol 4006 includes instructions to determine whether ACMON indicates the 13th or 14th slot or a lesser slot number. Slots one through 12 are concerned with various signal measurements. Slots 13 and 14, however, are concerned with controlling the drive signal for the inverter switches and terminating the comb pulse generated by counter one, respectively. If ACMON is not equal to or greater than 13, instruction routine four proceeds, via flow line 4007, to decision symbol 4020 and proceeds with the signal monitoring portion of the routine four. If ACMON is equal to or greater than 13, instruction routine four proceeds to decision symbol 4010, whose instruction determines if ACMON=14. If the answer is no, then routine four is in slot 13.

The switching devices of the inverter circuit are driven by the oscillator included in inverter drive 230 in FIG. 2 and producing the square wave signal identified as $\phi_2$. In the normal mode of operation, the signal $\phi_2$ must be maintained in synchronism with the square wave $\phi_1$ derived from the input AC sinusoidal voltage and be substantially in phase with the square wave $\phi_4$ derived from the output AC sinusoidal voltage. In other words, the inverter switching devices must be switched in phase with and close in time to zero crossings of the AC output signal. It is not practical to utilize an interrupt driven command to directly fire the inverter circuit switching devices at the output zero crossings because the interrupt may occur at a time which directly interferes with another interrupt directly or indirectly responsive to the primary AC input signal thereby causing a time delay deleterious to the proper operation of the real time control system. For example, if proper idling or battery charging requires that the signal $\phi_2$ be nearly in phase with the signal $\phi_1$, the operation of the high priority routines zero and one would prevent the proper operation of the inverter circuit by a pure stored program control of the control system and hence the instructions of routine four in slots 13 and 14 are combined with external circuitry to achieve accurate control of the inverter circuit's switching devices.

Figure 16:
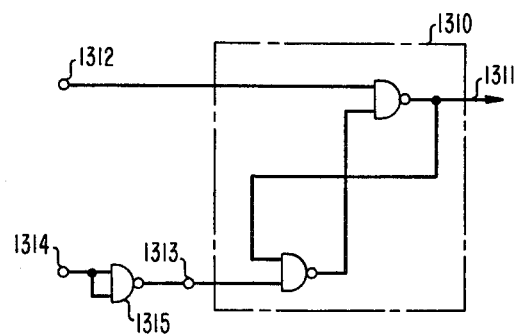
FIGS. 16 and 17 are block schematics of logic circuitry utilized in synchronously driving the switching devices of the inverter circuit.
Figure 17:
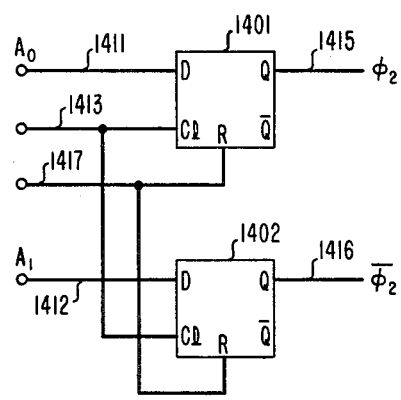

The operation of the instruction routine four during slot intervals 13 and 14 to be described below may be best understood by an overview of the operation involved in driving the switching devices of the inverter circuit. The circuit hardware involved with driving the switches is shown in FIGS. 16 and 17. FIG. 16 discloses a NAND latch circuit 1310 which has its output lead 1311 coupled to an enabling gate input of the gate 320 of counter two shown in FIG. 3. If the signal on lead 1311 is high, a count down in counter two is enabled; if this signal is low, a count down therein is disabled. This control output on lead 1311 is determined by the input applied to input terminals 1312 and 1313 of the NAND latch circuit. A negative trigger pulse supplied by the tooth pulse of slot 13 is applied to input 1312 and causes the signal on lead 1311 to go high. A positive trigger pulse derived from and coincident with the zero crossing of the AC output signal is applied to terminal 1314 and inverted to a negative trigger pulse by NAND gate 1315. Its appearance at NAND latch input terminal 1313 causes the signal level on lead 1311 to go low thereby disabling a count down in counter two.

The immediate driving circuit for the switching devices of the inverter circuit comprises two D type flip-flops 1401 and 1402 as shown in FIG. 17. The bits zero and one of the word in the output port A, which control relative phasing of the two switching devices, as described above, are coupled to the D input terminals 1411 and 1412 of flip-flops 1401 and 1402, respectively. The output of the RAM chip time or counter three is applied to terminal 1413 which is connected in parallel to both clock inputs of the two flip-flops 1401 and 1402. The tooth pulses representing slot 13 generated by counter one are applied in parallel on lead 1417 to the reset input of both flip-flops 1401 and 1402.

The beginning of the switch drive signal generation process depends upon a number entered for count down in counter three which has been established in routine five as described hereinbelow. Count down in counter three begins in slot 14 in routine four. At this point in time, the counter two previously set up in routine zero with a count of 61A8 is now probably disabled by the zero crossing of the AC output voltage and not counting down. When slot 13 occurs, the tooth pulses applied to lead 1312 of the NAND latch causes the output on lead 1311 to go high enabling counter two to start counting down the number entered in routine zero as described above.

During the subsequent 14th slot interval of routine four, the counter three is preset with a number derived in routine five during a previous cycle of operation of the control routines and initiates count down of this number therein.

As soon as a zero crossing of the AC output voltage occurs, a related trigger pulse is applied to input lead 1314 and the inverted signal at terminal 1313 causes the NAND latch to flip and inhibit count down in counter two. This zero crossing also invokes routine five which reads the value in counter two to calculate DELAY, a word used in counter three to control inverter phase delay.

The count down of DELAY in counter three continues until count down is complete whereupon counter three applies a signal directly to clock the D flip-flops 1401 and 1402. The D information on leads 1411 and 1412 is supplied by bits zero and one of the word placed at output port A and controls the relative phasing of the two inverter switches. The clocking input on lead 1413 transfers the $\phi_2$ and $\overline{\phi}_2$ signal drive to the output leads 1415 and 1416 which supplies the drive signal to drive each of the inverter circuit's switching devices.

These D input signals are checked and connected every 13th slot in routine four which applies a reset input to the two D flip-flops via lead 1417.

Following a decision in decision symbol 4010 of routine four that routine four is in the 13th slot, instructions of a subsequent process symbol 4012 provides the signal which is applied to reset the two D flip-flops 1401 and 1402. Instructions of the following decision symbol 4014 inquire if the inverter circuit is presently operative. If it is, the instruction routine proceeds to process symbol 4016 whose instruction sets the proper relative phase $\phi_2$ and $\overline{\phi}_2$ to correspond to previous operating states which are determined by a word in storage identified as $\phi_3$ which defines the proper relative phases of the inverter switches.

If the inverter circuit is not presently running, an instruction of subsequent process symbol 4018 applies a signal to reset both D flip-flops and set both output $\phi_2$ and $\overline{\phi}_2$ equal to zero, to allow a subsequent preset for proper phasing when the inverter circuit is again started. In each response to decision symbol 4014, the instruction routine four proceeds to decision symbol 4020 which begins the signal measurement phase of routine four.

If in response to decision symbol 4010 it is determined that routine four is in its 14th slot, the instruction routine four proceeds to process symbol 4022 which supplies a signal to a control gate of counter one to lock its output into a high state so that no further teeth pulses and hence slot intervals are generated since all the signal sampling intervals of instruction routine four have been completed.

An instruction of a subsequent process symbol 4024 starts the counter three into its count down so that the inverter switching drives may be fired at the proper phase delay at the expiration of the count down irrespective of the operation of any other interrupt routines.

Decision symbol 4026's instructions investigate the state of the bit value $CX_2$ to determine if the AC input signal is acceptable. If the AC is unacceptable, process symbol 4028's instructions inserts a preset delay value in the word value DELAY to permit a quick shift into an internal operating mode where the inverter circuit supplies power to the output load.

If decision symbol 4006 determines that ACMON is less than 13, the instruction routine four directly proceeds via flow line 4007 to decision symbol 4020. The preceding instruction sequences occurring in slots 13 and 14 also terminate and enter decision symbol 4020 which operates to determine if the primary AC signal is acceptable as a means of indicating which mode of operation the power supply is in. A no decision causes the instruction routine to proceed along flow line 4019; a yes decision causes it to proceed along flow line 4021.

It will assist in understanding this signal monitoring routine described below if it is understood that the multiplexer is set up to couple to a particular sensing meter in one particular slot while the actual meter reading obtained through the A to D converter is performed in the next subsequent slot.

Flow line 4019 leads to process symbol 4030 which automatically decrements the word VOMON. VOMON is a word set up in routine five and is synchronized with the AC output voltage so that when VOMON=0 the output voltage is at its peak value. Accordingly, VOMON is frequently investigated in the various routines so that the output voltage is accurately sampled at its peak value. If VOMON has been decremented to less than zero, it is apparent that the peak value of the output voltage has already been read.

If decision symbol 4032 determines that VOMON is not greater than zero, subsequent decision symbol 4034 inquires through its instructions if VOMON is less than zero. If VOMON is equal to zero, subsequent instructions of process symbol 4036 set up the multiplexer to read the AC output voltage and the instruction routine returns to flow line 4029.

If decision symbol 4032 instructions determines that VOMON is less than zero, it is obviously equal to $-1$ and with the multiplexer having been set up in the previous slot, process symbol 4038's instruction operates to read the voltage value of the AC output voltages from the A to D converter and store its value in memory. Process symbol 4038's instruction also sets VOMON equal to 16 as a safety measure, should an output signal zero crossing not occur and hence fail to set up the word VOMON subsequently. Accordingly, even if this failure occurs, at least one additional output peak voltage reading is assured. The instruction routine four then returns to flow line 4029.

If VOMON is greater than zero, the instruction routine proceeds to decision symbol 4040 whose instruction determines whether the present call of routine four is in an even or odd slot. The multiplexer is set to read samples of the AC input voltage during odd slots and the actual readings are taken during even slots. Hence process symbol 4042 is accessed during odd slots and sets up the multiplexer to connect the A to D converter to the primary AC input voltage and the instruction routine returns to flow line 4029. Process symbol 4042's instructions further command that the DC quantities for which the multiplexer was set during the even slots be read from the A to D converter.

If the ACMON value indicates an even slot condition, process symbol 4044 commands that the input AC voltage be read from the A to D converter and sets up the multiplexer to read various other signal values of the power supply including DC voltage values and various current levels and proceeds to decision symbol 4046 whose instructions evaluate if the primary input AC voltage is acceptable by evaluating if it is between acceptable limits. If it is acceptable, the word GOODCOUNT is incremented in process symbol 4048 and the routine proceeds to flow line 4029 which, in turn, proceeds to exit the routine four. GOODCOUNT is a word in memory that is used to keep track of acceptability of successive samples of the input AC sinusoidal voltage.

Flow line 4021, which originated in response to a yes determination of decision symbol 4020, proceeds to decision symbol 4050 which evaluates if ACMON is equal to the value six. This decision is concerned with the appropriate times to close the line switch if the power supply had been operating in the internal or bypass mode. This decision symbol 4050 and the following decision symbol 4052 and process symbol 4054 operate to close the line switch if it is open and the input AC voltage is acceptable.

If the line switch is already closed, decision symbol 4052's instruction directs the routine four to flow line 4051 and to process symbol 4060. If, however, ACMON equals six and the line switch is open, the routine proceeds to process symbol 4054 whose instruction decrements a delay value for delaying closing the line switch set up in routine one when synchronism is established. Subsequently decision symbol 4056's instruction inquires if this delay value equals zero. If the line switch is open, it is apparent that the power supply is operating in the internal mode with the inverter circuit supplying power to the load. The delay allows time for the control circuit to establish the credibility of the AC input signal before the line switch is reclosed. Hence as is apparent from the flow chart of routine four, process symbol 4058 is operative to close the line switch only after the initial delay period has expired and the AC input signal is acceptable.

Process symbol 4060's instruction decrements the word VOMON and the routine four proceeds to decision symbol 4062. Decision and process symbols 4062, 4064, 4066 and 4068 operate identically as decision and process symbols 4032, 4034, 4036 and 4038 described hereinabove.

Flow line 4092 leads to decision symbol 4070 which, in turn, connects to process symbols 4072 and 4074. These operate identically with decision and process symbols 4040, 4042 and 4044 described hereinabove.

If the input AC voltage is unacceptable as per decision symbol 4076, subsequent process symbol 4078 decrements the word BADCOUNT. If the word BADCOUNT=0, process symbol 4082 opens the line switch and routine four is terminated at terminal symbol 4090. If the input AC is acceptable or BADCOUNT does not equal zero, routine four is terminated without opening the line switch.

As discussed above, the inverter is driven at a phase angle relative to the input and output AC signals so that it either idles or controllably charges the battery voltage source. The proper phase delay for idling is determined by routine five and is modified in routine zero, discussed above, to effect battery charging of the reserve DC voltage source.

The function of routine five and how it controls the inverter delay may be ascertained by an overview of the meaning of the terms DELAY, BIAS and the operative function of counter two. The meaning of these values may be ascertained by reference to FIG. 15 and, in particular, waveform 1101 which represents the primary AC input voltage.

Count down in counter two of its preset value of 61A8 is initiated in routine zero and begins just shortly after routine zero is initiated at time arrow 1106. The output of counter two is a rectangular waveform that is initially high followed by a second rectangular pulse having a low or zero state. This output signal is shown by waveform 1118 in FIG. 15. Counter two is disabled by the NAND latch when the zero crossing of the output AC voltage occurs at time arrow 1116 and hence counter two never produces the second low state rectangular waveform since it is always reset prior to that event. The value remaining in counter two at disabling is used in routine five as the basis for determining the phase angle difference between the input AC voltage and the firing of the inverter circuit switching devices. The actual counting circuit firing these switching devices is the counter three located on RAM chip 304 in FIG. 3 which was initialized with a count value in slot 13 of routine four and began counting down immediately. The count down interval of counter three is the time interval 1113 shown in FIG. 15. Its output is initially in a high state when it is initially loaded, and stays high for one half the count down interval. Its output then goes low for the second half of the count down interval and again goes high at the end of the count down interval, at which point, it supplies the clocking signal to fire the inverter circuits switching devices. The particular waveform shown in FIG. 15 is that associated with the idling of the inverter circuit. This waveform changed in duration of the high and low states to implement battery charging in response to routine zero.

Figure 13:
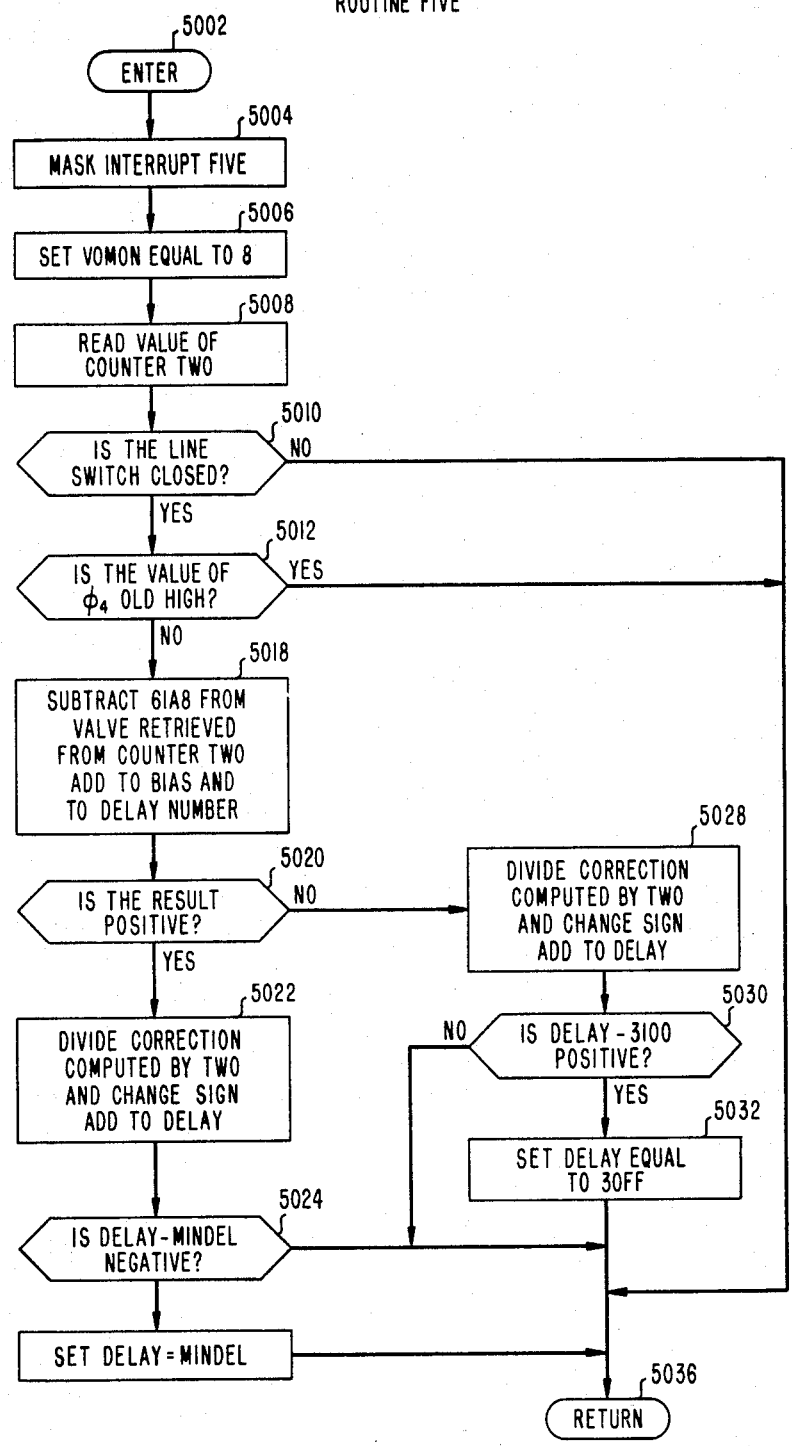

Routine five shown in FIG. 13 is initiated in response to a zero crossing of the AC output voltage at time arrow 1116 in FIG. 15 and enters at entry terminal 5002. Routine five is immediately masked in process symbol 5004 to prevent an interrupt response to transient ringing signals. VOMON is set equal to eight in process symbol 5006 to establish the proper time to sample the AC output voltage at its peak value. VOMON is decremented in routine four as described above and when it reaches zero, the AC output voltage is measured for its peak value. Process symbol 5008's instructions read the value of counter two and stores it for computation purposes in determining the phase of the drive for the inverter switching devices. As described above, the value in counter two was frozen by a signal applied to its enable gate in response to a zero crossing of the AC output voltage. This frozen value is a representative measure of the time from the zero crossing of the AC input voltage to the zero crossing of the AC output voltage.

Decision symbols 5010 and 5012 are concerned with if the power supply is operating normally, that is, the power to the load is supplied by the primary AC signal. If the line switch is open, the instruction routine is terminated at terminal symbol 5036. Decision symbol 5012's instruction determines if $\phi_4$ old is high. $\phi_4$ old is the polarity value of $\phi_4$ when last recorded. This decision of symbol 5012 is for the purpose of assuring that a delay value is computed only every other half cycle of operation so as to avoid introducing dissymmetries into the driving of the inverter switching devices. The routine is terminated at terminal symbol 5036.

If conditions are appropriate, process symbol 5018's instruction subtracts the value 61A8 from the remaining count retrieved from counter two and adds to it the value of BIAS and DELAY.

Please note that the sum obtained will normally be a negative number. As described above, counter two is initialized in routine zero with the number 61A8 and counts down until a zero output crossing of the AC output voltage occurs. The initial number 61A8 is subtracted from the remaining number when the count down is terminated. This difference number is related to the time interval between the initialization of counter two to the AC output voltage zero crossing. Since counter two is initialized in routine zero just after the zero crossing of the AC input voltage and counter three is not initialized until slot 14 of routine four, the difference number determined from counter two cannot be put directly into counter three. The value 61A8 subtracted from the remaining count in counter two and the initial count value actually inserted in counter three differs by the count value identified herein as BIAS. The value BIAS is determined experimentally for each power supply by manually adjusting for inverter idle and is stored in memory.

The difference value obtained is added to the BIAS value, where value, in turn, is added to the existing delay number. Note that because of the negative sign associated with the difference value, the effect of adding the previous delay number to it will result in zero if no change must be made in the inverter phase. Normally, however, the result is not zero but is some small positive or negative number. The subsequent instruction of routine five operate to evaluate the new DELAY number to be put into counter three. If the result of the computation in process symbol 5018 is positive, as determined, via decision symbol 5020, process symbol 5022's instruction divides the value by two, changes the polarity and adds it to the DELAY value. The reason for dividing the value by two is to permit the new DELAY number to move only ½ the distance to the new phase angle in order to reduce transient phenomenon due to the phase angle change. Decision symbol 5024's instruction determines if the DELAY value minus MINDEL is positive or negative. If it is negative, the minimum delay of the inverter is set to value MINDEL in process symbol 5026. If the value is not negative, interrupt five is reenabled and the routine is terminated at symbol 5036.

If the result of process symbol 5018 is negative, the instruction flow proceeds to process symbol 5028 which again divides the value computed by two, changes the sign and adds it to DELAY. If the value DELAY minus 3100 is positive, via decision symbol 5030, DELAY is set to a fixed maximum value of 30FF. If not, routine five is terminated.

Routine six occurs only when the inverter is initially turned on and is concerned with delaying turn on to avoid the effect of bounce of the battery connecting contactor. When the inverter circuit finally starts, it is started with a 90° phase delay relative to the AC input voltage. Routine six is called by an interrupt responsive to the closing of the contactor that connects the battery to the inverter, and is operative for starting the firing sequence of the inverter circuits SCRs.

Figure 14:
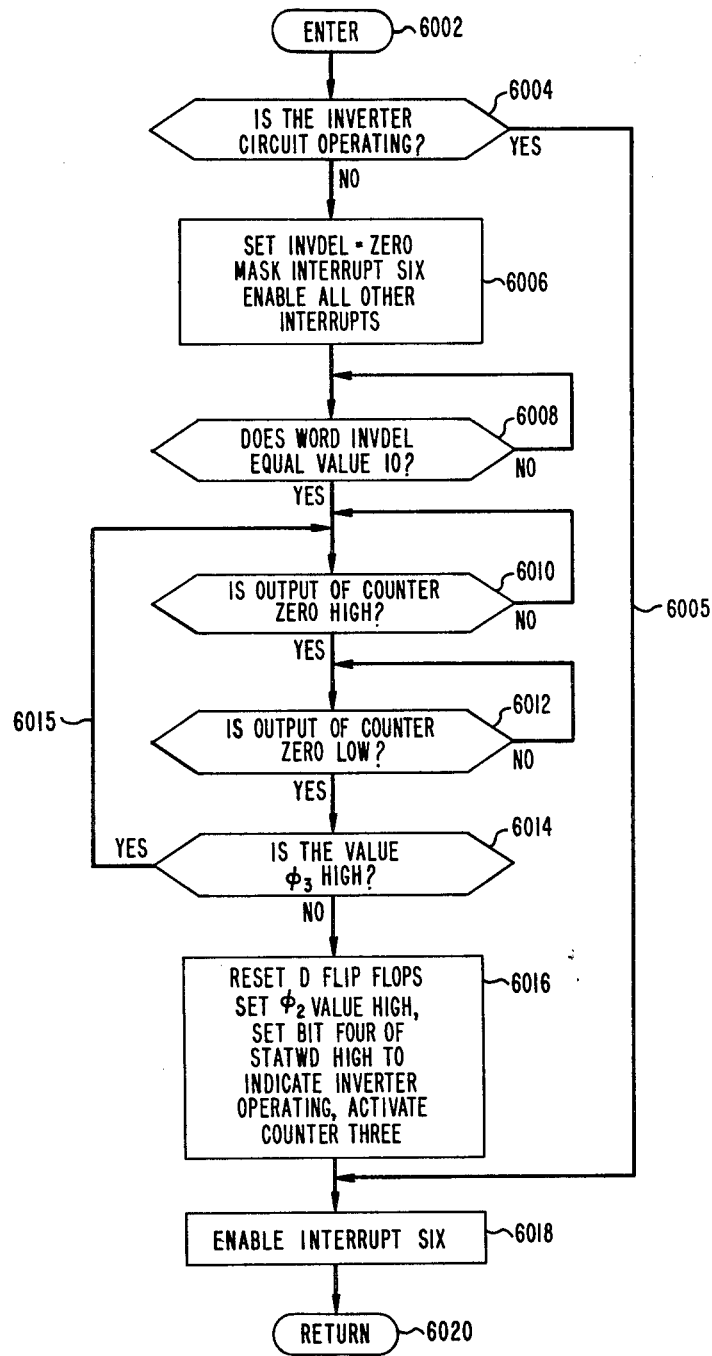

Routine six shown in FIG. 14 is entered in entry terminal 6002 when the contactor is raised to interconnect the battery and the inverter circuit. Decision symbol 6004's instruction inquires if the inverter is already operating. If it is, then routine six is not necessary and the routine proceeds, via flow line 6005, to process symbol 6018 having instructions reenabling interrupt six and leading to an exit from the routine in exit terminal 6020.

If the inverter is not operating, the instruction routine six proceeds to process symbol 6006 whose instruction sets up the word INVDEL, a start up delay word initially set with the value zero. Interrupt six is disabled to prevent response to contact bounce and all other interrupts are enabled so they will continue to operate normally. The word INVDEL is incremented each time routine zero is called. Instruction routine six does not proceed until INVDEL equals 10 as per decision symbol 6008 or in other words, 10 half cycles of the input AC signal have occurred since the contactor was lifted.

When these 10 half cycles have occurred, the inverter circuit must be started with its output signal properly phased with the AC input voltage and with a phase delay of 90° with respect thereto for the first half cycle of operation. This temporary 90° phase lag is introduced to limit starting transients.

Decision symbol 6010's instruction prevents the instruction routine from proceeding until the output of counter zero is high. As discussed above, the output of counter zero is high for approximately 4 milliseconds and low for a subsequent 4 milliseconds as can be seen in wave form halves 1111 and 1112 in FIG. 15. Subsequent decision symbol 6012 prevents the routine six from continuing until the output of counter zero is low. The combined effect of symbols 6010 and 6012 assures that the routine six proceeds at the approximate time when the counter zero output changes from a high to a low state which time interval represents a 90° phase delay angle.

If the value $\phi_3$ is high, decision symbol 6014's instruction directs the routine six to proceed to process symbol 6016. If not, the routine proceeds, via flow line 6015, back to decision symbol 6010 where the routine six is repeated. $\phi_3$ is a hypothetical square wave represented by a word in memory and indicates the phase of the AC input signal and hence is used to assure the starting of the inverter when the AC input voltage is positive.

Process symbol 6016's instruction resets the D flip-flop and sets output $\phi_2$ high. Bit four of STATWD is set high to indicate operation of the inverter circuit and counter three on the RAM chip is activated. Interrupt six is again enabled in block 6018 and the routine is exited at exit terminal 6020.

The above specification has described an uninterruptible power supply whose controls are a unique blend of stored program control instructions with hardware control components and a parallel power processing power train. Many variations of the arrangement will suggest themselves to those skilled in the art without departing from the spirit and scope of the invention.

What is claimed is:

1. An uninterruptible power supply comprising;
a voltage regulating transformer, first input means for coupling a primary AC voltage source to the regulating transformer, an inverter circuit adapted to be energized by a reserve DC voltage source, second input means for coupling a signal output of the inverter circuit to the regulating transformer, control means for adjusting a signal phase of a voltage signal output to eliminate power drain from the reserve DC voltage source, the means for adjusting including a first counter, means for presetting the first counter, means for initiating count down in the first counter at some predetermined time related to a zero crossing of a voltage signal of the primary AC voltage source, means for terminating count down in the first counter in response to a zero crossing of an AC voltage signal at an output of said regulating transformer and means for determining a phase angle at which the voltage signal output is generated by responding to a count remainder in the first counter.

2. An uninterruptible power supply as defined in claim 1 wherein said means for determining comprises;
a second counter, means for presetting the second counter with a count derived from the count remainder of the first counter, means for initiating count down in the second counter in each half cycle of the signal of the primary AC voltage source at a fixed time near the end of the half cycle and means responsive to expiration of count down in the second counter for driving a switching device of the inverter circuit into conduction.

3. An uninterruptible power supply as defined in claim 2 wherein said means for driving includes
means for determining alternate phasing of drive signals supplied to switching devices of the inverter circuit in proper relation to the signal of the primary AC voltage source and means for delaying application of drive signals until count down in the second counter is complete.

4. An uninterruptible power supply as defined in claim 3 and further including
means for determining a discharge condition of the reserve DC voltage source, and means for modifying a count entered into counter two in order to adjust the phase angle of the voltage signal output of the inverter to permit charging of the reserve AC voltage source by the primary AC voltage source through switching devices of the inverter circuit.

5. An uninterruptible power supply as defined in claim 3 wherein said means for driving includes
a first flip-flop and a second flip-flop, the means for alternate phasing coupling opposite phase signals to information inputs of the first and second flip-flops, respectively, and an output of the second counter being coupled to simultaneously clock the first and second flip-flops, outputs of the first and second flip-flops being coupled to first and second switching devices of the inverter circuit, respectively.

6. An uninterruptible power supply comprising;
a voltage regulating transformer including first input means for accepting a primary AC voltage signal and second input means for accepting a reserve AC voltage signal,
an inverter circuit having an output coupled to the second input means and including a third input means for accepting a reserve DC voltage,
phase control means for controlling a signal phase of the inverter circuit relative to the primary AC voltage signal comprising stored program control means, first and second counter means and switching device drive circuitry,
the first counter preset by the stored program control with a number that can be counted down in a time interval equaling a period of an acceptable frequency of the primary AC voltage signal, and means for starting count down thereof in substantial synchronism with a zero crossing of the primary AC voltage signal,
means for reading an instantaneous numerical value in the first counter in response to a zero crossing of an output AC voltage signal, and means for utilizing the numerical value to determine a DELAY count value,
means for placing the DELAY value in the second counter and means for initiating count down therein at a fixed time point in the primary AC voltage signal each half cycle, and
means for setting up appropriate alternate phasing of switching devices of the inverter circuit by controlling opposite complementary phasing of outputs of the switching device drive circuitry, and the switching device drive circuitry being responsive to a complete count down in counter two to apply firing signals to the switching devices.

7. An uninterruptible power supply as defined in claim 6 wherein said switching drive circuitry comprises;
a latch circuit responsive to zero crossings of an output AC signal and coupled to drive an enable gate of the first counter, and first and second parallel connected flip-flop circuits connected to be clocked by an output of the second counter, and having first and second output terminals, respectively, coupled to drive oppositely phased switching devices of the inverter circuit.

8. An uninterruptible power supply as defined in claim 7 wherein the stored program control further includes means for controlling battery charging with charging current supplied from the primary AC voltage through the inverter circuit including
means for determining an operating condition of the battery voltage and means for adding a value to DELAY to shift the inverter phase and permit battery charging.

9. An uninterruptible power supply as defined in claim 8 further including means for maintaining a history of battery discharges and means for adjusting the word DELAY to supply added current after a current drain of the battery, including means for periodically decrementing a number to time recharging of the battery.

10. An uninterruptible power supply comprising;
a voltage regulating transformer including, output means, first input means for accepting a primary AC voltage signal and second input means for accepting a reserve AC voltage signal, and an inverter circuit having an output coupled to the second input means and including a third input means for accepting a reserve DC voltage,
phase control means for controlling a signal phase of the inverter circuit relative to the primary AC voltage including stored program control means, first and second counters and drive circuitry for controlling switching devices of the inverter circuit,
the stored program control including first instructions for presetting a word for count down into the first counter and initiating count down therein in substantial synchronism with a zero crossing of the primary AC voltage signal,
second instructions for terminating count down in the first counter in response to a zero crossing of an output AC signal at the output means and utilizing a remaining count value therein to calculate a delay number and insert that number into the second counter,
third instruction means operative to initiate count down in the second counter at a fixed time each half cycle of the primary AC voltage and the drive circuitry being responsive to an output of the second counter and operative to supply a drive signal to the switching devices of the inverter circuit.

11. An uninterruptible power supply including a regulating transformer with output means for accepting a load,
first input means for coupling a primary AC voltage signal to the transformer,
an inverter circuit having an output coupled to the transformer;

second input means for coupling a reserve DC voltage source to the inverter, wherein the improvement comprises;

stored program control means for controlling switching of the inverter at a controlled phase angle relative to an output signal at said output means, the stored program control means including data processing means, memory means and interface means for monitoring signal conditions of the power supply, the data processing means counting down a word stored in a first counting circuit in response to the interface means in synchronism with the primary AC voltage signal, the data processing means including means for terminating the count down of the preset word in response to the interface means when an AC signal at the output means changes state, the data processing means including means for using a remainder of the preset word to control a firing angle of the inverter switching devices.

12. An uninterruptible power supply as defined in claim 11 wherein said means for using comprises;
a second counting circuit and means for synchronizing a count down in the second counting circuit with the primary AC voltage signal.

13. An uninterruptible power supply as defined in claim 12 further including
means for recording a discharge of the reserve DC voltage source and means for adjusting the means for using to permit the reserve DC voltage source to be supplied by a charging current from the primary AC voltage signal through the regulating transformer and the inverter circuit.

* * * * *